United States Patent
Vernekar et al.

(10) Patent No.: US 11,002,464 B2
(45) Date of Patent: May 11, 2021

(54) STACKING BRACKET FOR AN HVAC UNIT

(71) Applicant: Johnson Controls Technology Company, Auburn Hills, MI (US)

(72) Inventors: Shridhar V. Vernekar, Sirsi (IN); Siddappa R. Bidari, Pune (IN); Bhushan C. Kadu, Pune (IN); Ravindra B. Salunkhe, Satara (IN); Satyajit P. Phadtare, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 34 days.

(21) Appl. No.: 16/351,304

(22) Filed: Mar. 12, 2019

(65) Prior Publication Data

US 2020/0284470 A1 Sep. 10, 2020

Related U.S. Application Data

(60) Provisional application No. 62/814,456, filed on Mar. 6, 2019.

(51) Int. Cl.
*F16M 13/00* (2006.01)
*F24F 13/32* (2006.01)
*F16M 7/00* (2006.01)

(52) U.S. Cl.
CPC ............... *F24F 13/32* (2013.01); *F16M 7/00* (2013.01)

(58) Field of Classification Search
CPC .................................................... F24F 13/32
USPC ................................. 248/672, 673, 674, 675
See application file for complete search history.

(56) References Cited

U.S. PATENT DOCUMENTS

| | | | | |
|---|---|---|---|---|
| 4,979,559 | A * | 12/1990 | Dennis | F24F 13/32 165/67 |
| 5,076,534 | A * | 12/1991 | Adam | F24F 13/32 248/678 |
| 5,743,393 | A | 4/1998 | Webb et al. | |
| 8,640,632 | B1 * | 2/2014 | Odle | F24F 1/60 108/55.5 |
| 9,272,829 | B2 | 3/2016 | Wynnick et al. | |
| 9,845,971 | B1 | 12/2017 | Wynnick et al. | |
| 10,054,333 | B1 * | 8/2018 | Colvin | F24F 13/32 |
| 2004/0211878 | A1 * | 10/2004 | Orozco | F24F 13/32 248/679 |
| 2010/0320360 | A1 * | 12/2010 | McLeod | F16M 5/00 248/678 |
| 2013/0340982 | A1 * | 12/2013 | Johnson | F24F 5/00 165/121 |

(Continued)

*Primary Examiner* — Steven M Marsh
(74) *Attorney, Agent, or Firm* — Fletcher Yoder, P.C.

(57) ABSTRACT

The present disclosure relates to a bracket for stacking heating, ventilation, and/or air conditioning (HVAC) units. The bracket includes a corner portion having a first raised section and an alignment protrusion that extends from the corner portion. The bracket also includes a first arm extending from the corner portion, where the first arm includes a second raised section at a first end of the first arm, and where a first strap recess is formed between the first raised section and the second raised section. The bracket further includes a second arm extending from the corner portion, where the second arm includes a third raised section at a second end of the second arm, and where a second strap recess is formed between the first raised section and the third raised section.

20 Claims, 20 Drawing Sheets

(56) References Cited

U.S. PATENT DOCUMENTS

2015/0069208 A1* 3/2015 Wynnick .................. F24F 13/32
                                                     248/675
2015/0158647 A1* 6/2015 Wynnick .................. B65D 7/00
                                                     248/675

* cited by examiner

STACKING BRACKET FOR AN HVAC UNIT

CROSS-REFERENCE TO RELATED APPLICATIONS

This application claims priority from and the benefit of U.S. Provisional Application Ser. No. 62/814,456, entitled "STACKING BRACKET FOR AN HVAC UNIT," filed Mar. 6, 2019, which is herein incorporated by reference in its entirety for all purposes.

BACKGROUND

This disclosure relates generally to heating, ventilation, and/or air conditioning (HVAC) systems. Specifically, the present disclosure relates to a bracket that facilitates stacking of HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A wide range of applications exist for HVAC systems. For example, residential, light commercial, commercial, and industrial HVAC systems are used to control temperature and air quality in an interior space of a building or other suitable structure. Generally, the HVAC systems include one or more HVAC units that facilitate the transfer of thermal energy between the interior space and an ambient environment, such as the atmosphere. HVAC units are typically assembled in a manufacturing facility that may produce hundreds or thousands of HVAC units annually. Upon assembly, the HVAC units are conventionally stacked in vertical arrays to facilitate space efficient storage and/or transportation of the HVAC units. Vertical stacking of the HVAC units may cause enclosures of certain HVAC units positioned below other HVAC units to absorb a compressive force that is generated due to a weight of the above-laying HVAC units. Unfortunately, application of such compressive forces to the lower HVAC units may, in some cases, cause enclosures of the lower HVAC units to bend or deform. Moreover, the HVAC units may translate relative to one another while stacked within the vertical array during handling or transportation of the vertical array, which may scratch or impart wear to an exterior surface of the HVAC unit enclosures.

SUMMARY

The present disclosure relates to a bracket for stacking heating, ventilation, and/or air conditioning (HVAC) units. The bracket includes a corner portion having a first raised section and an alignment protrusion that extends from the corner portion. The bracket also includes a first arm extending from the corner portion, where the first arm includes a second raised section at a first end of the first arm, and where a first strap recess is formed between the first raised section and the second raised section. The bracket further includes a second arm extending from the corner portion, where the second arm includes a third raised section at a second end of the second arm, and where a second strap recess is formed between the first raised section and the third raised section.

The present disclosure also relates to a bracket for stacking heating, ventilation, and/or air conditioning (HVAC) units. The bracket includes a corner portion having a base surface and a plurality of walls that extend from the base surface to define a first raised contact surface of the corner portion. The bracket also includes a first arm extending from the corner portion, where the first arm includes a second raised contact surface at a first end of the first arm, and where a first strap surface extends between the first raised contact surface and the second raised contact surface. The bracket further includes a second arm extending from the corner portion, where the second arm includes a third raised contact surface at a second end of the second arm, and where a second strap surface extends between the first raised contact surface and the third raised contact surface. The first raised contact surface, the second raised contact surface, and the third raised contact surface of the bracket are configured to support weight of an HVAC unit.

The present disclosure also relates to a mounting bracket kit that includes a plurality of brackets for stacking heating, ventilation, and/or air conditioning (HVAC) units. The plurality of brackets includes a corner bracket having a corner portion that includes a first raised section and an alignment protrusion that extends from the corner portion. The corner bracket also includes a first arm that extends from the corner portion and includes a second raised section at a first end of the first arm, where a first strap recess is formed between the first raised section and the second raised section. The corner bracket further includes a second arm that extends from the corner portion and includes a third raised section at a second end of the second arm, where a second strap recess is formed between the first raised section and the third raised section. The first raised section, the second raised section, and the third raised section of the corner bracket are configured to support weight of an HVAC unit positioned on the corner bracket.

BRIEF DESCRIPTION OF THE DRAWINGS

Various aspects of this disclosure may be better understood upon reading the following detailed description and upon reference to the drawings in which.

DETAILED DESCRIPTION

Figure 1:
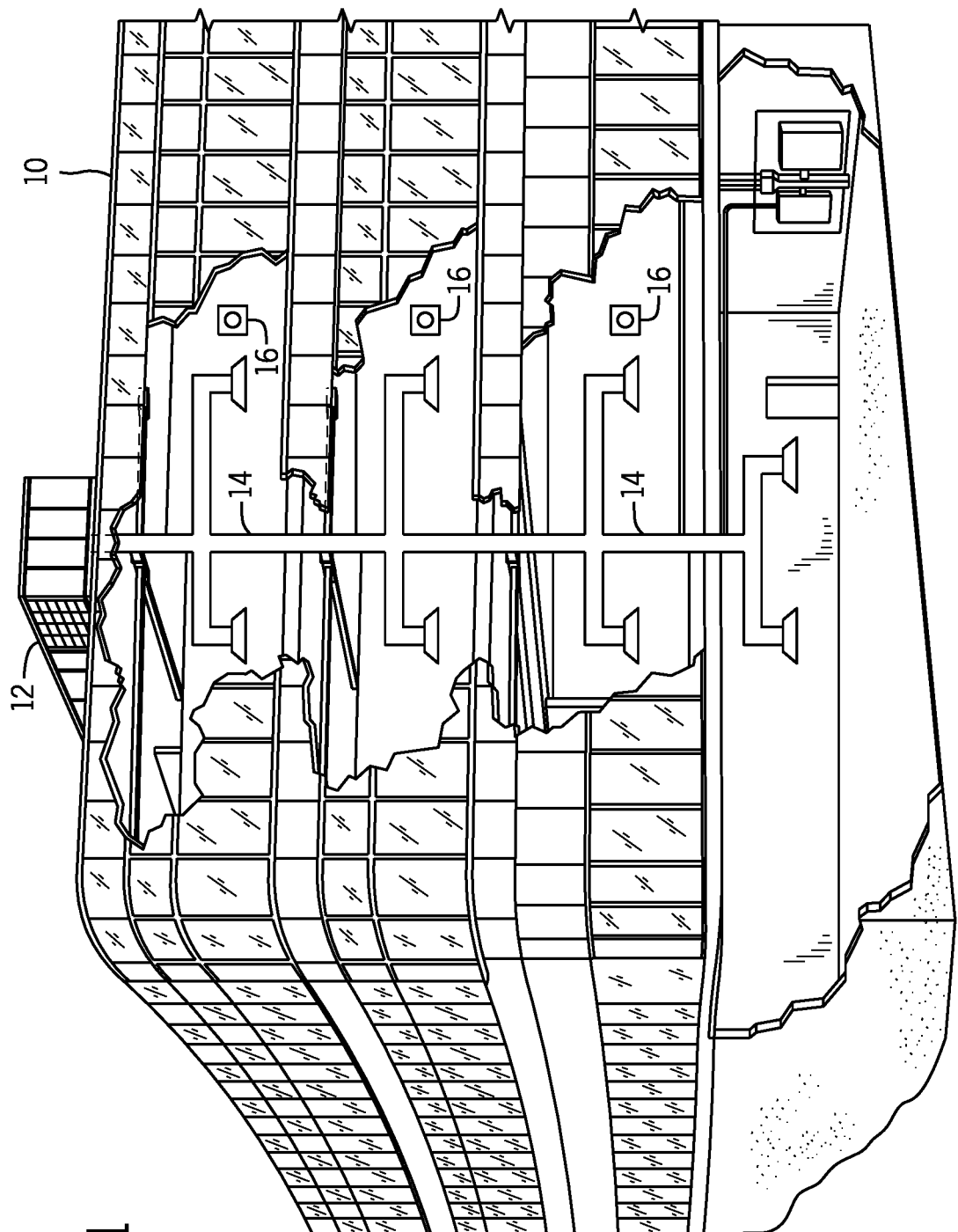
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, heating, ventilation, and/or air conditioning (HVAC) units generally include an enclosure, also referred to herein as an HVAC enclosure, which houses internal components of the HVAC units, such as a compressor, a blower, heat exchangers, one or more HVAC controllers, and/or any other suitable HVAC components. The HVAC units are typically manufactured and assembled in a commercial manufacturing facility that, as discussed in detail below, may test, charge, wire, and pipe the HVAC units for installation within a building or other structure. Upon assembly and/or testing of the HVAC units, sets of individual HVAC units may be stacked in vertical arrays, with respect to gravity, to facilitate space-efficient storage of the HVAC units within a warehouse or other storage location of the manufacturing facility. That is, the HVAC units may be stacked in vertical arrays that include 2, 3, 4, 5, or more than five HVAC units stacked on top of one another.

In some cases, the vertical arrays of HVAC units may be positioned on a transportation vehicle, such as a tractor trailer assembly, which is configured to transport the HVAC units to the building for installation. In certain cases, the HVAC units may translate or shift relative to one another during such handling or transportation procedures, which may cause the enclosures of the HVAC units to incur scratching or wear. Further, when the HVAC units are stacked in the vertical array, compressive forces generated due to a weight of certain HVAC units positioned above other HVAC units may cause portions of the HVAC enclosures to bend or deform. Additionally, compressive forces that may be generated by straps configured to secure the HVAC units to the transportation vehicle may cause portions of the HVAC unit enclosures to incur wear.

It is now recognized that blocking translational movement between vertically-arrayed HVAC units during stacking, handling, and/or transportation of the HVAC units may mitigate or substantially reduce a likelihood of scratching or otherwise decreasing an aesthetic appearance the HVAC enclosures. Moreover, it is now recognized that transmitting compressive forces through particular portions of the HVAC enclosures that are reinforced to support such loads may substantially eliminate bending or deformation of the HVAC enclosures.

With the foregoing in mind, embodiments of the present disclosure are directed to various spacers or stacking brackets that are positionable between adjacent HVAC units in the vertical array and are configured to transmit compressive forces between the HVAC units along particular portions of the HVAC enclosures. Specifically, the stacking brackets may be placed along respective portions of the HVAC enclosures that may be reinforced or otherwise designated to support relatively high compressive loads and/or tensile loads without deformation. Accordingly, the stacking brackets may eliminate undesirable physical contact between portions of the HVAC enclosures that may be ill-equipped to support such loads. Moreover, the stacking brackets are configured to substantially block translational movement between HVAC units in the vertical array, and thus, may substantially prevent scratching or wear on the HVAC enclosures that may occur due to interaction between adjacent HVAC enclosures in the vertical array. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
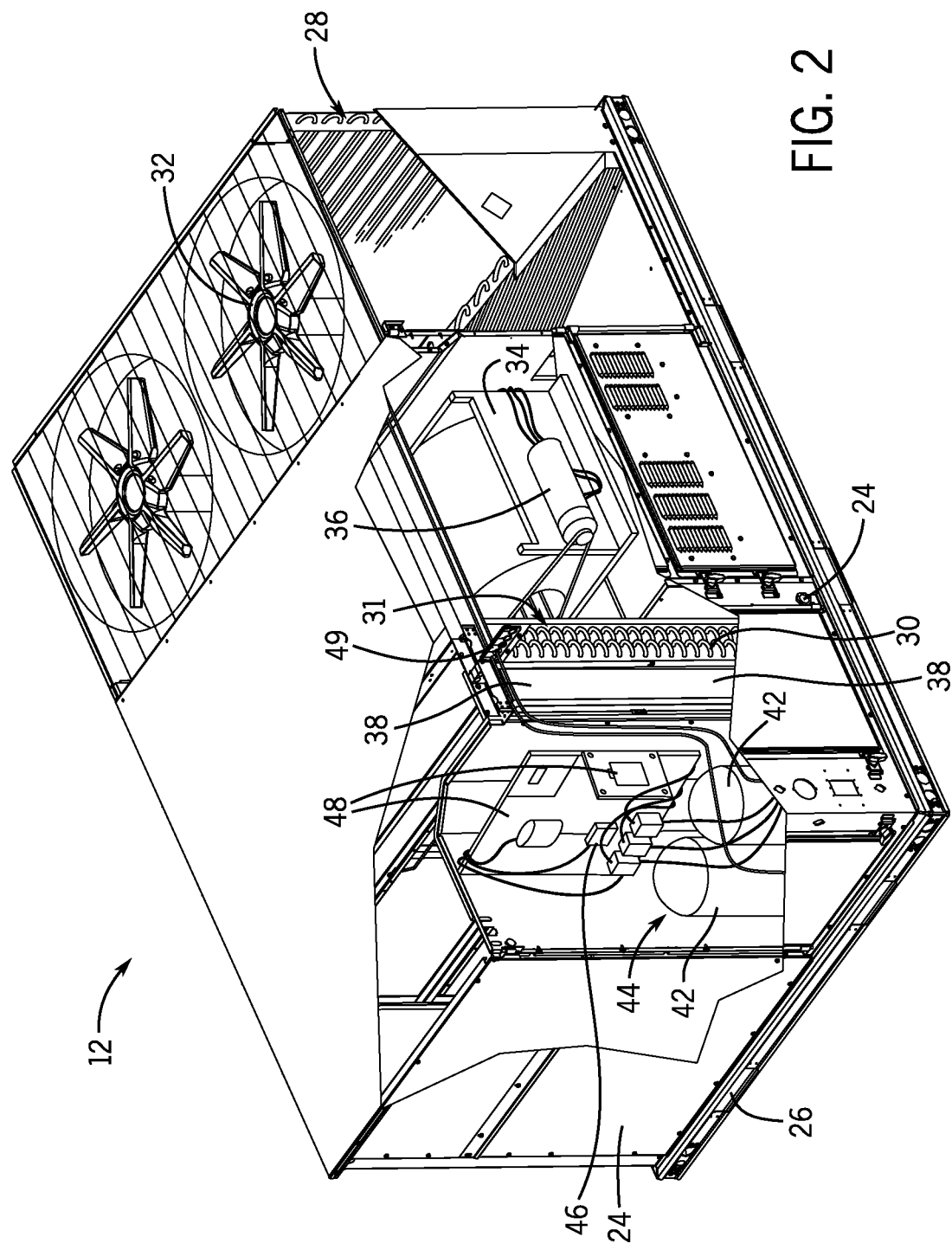
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
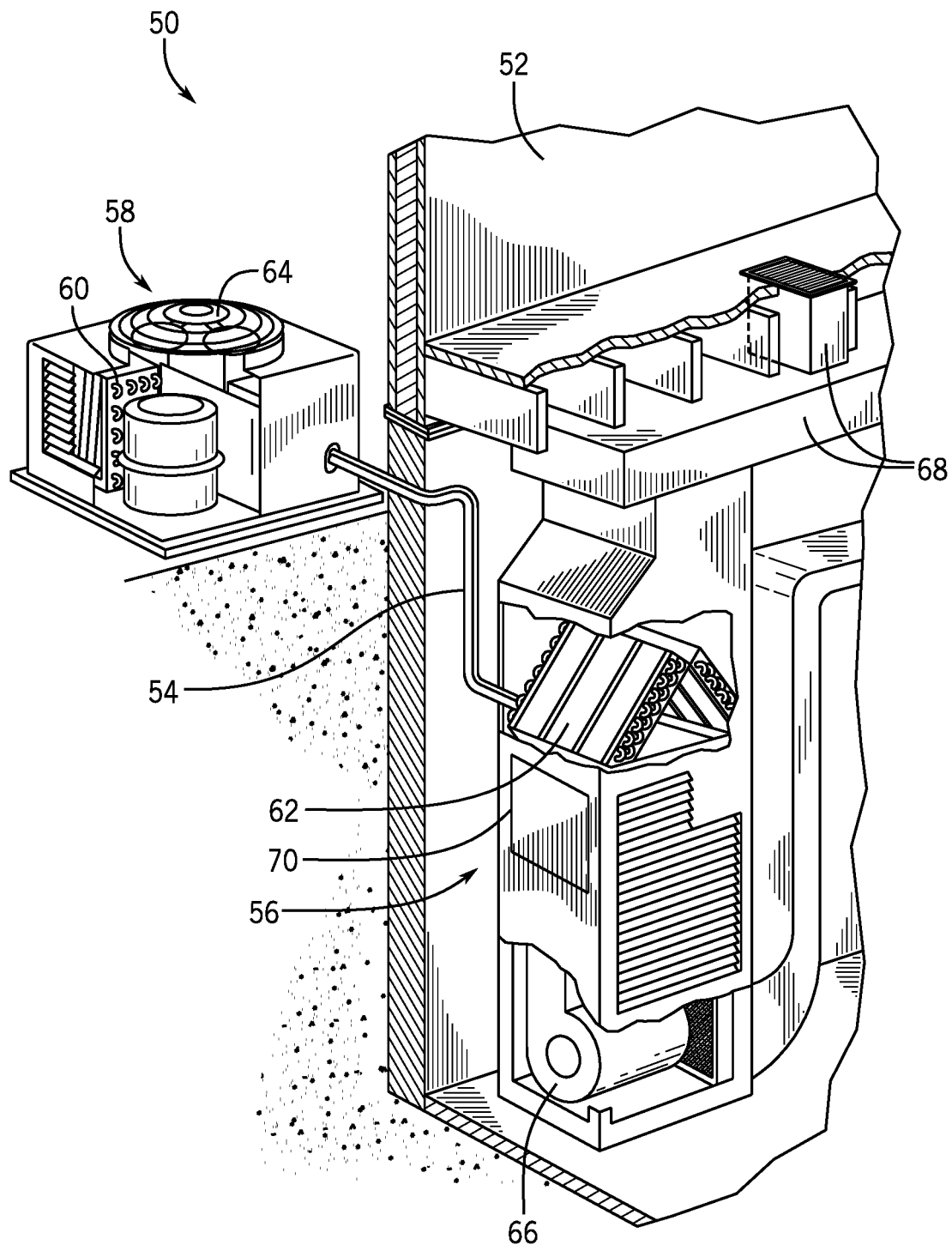
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
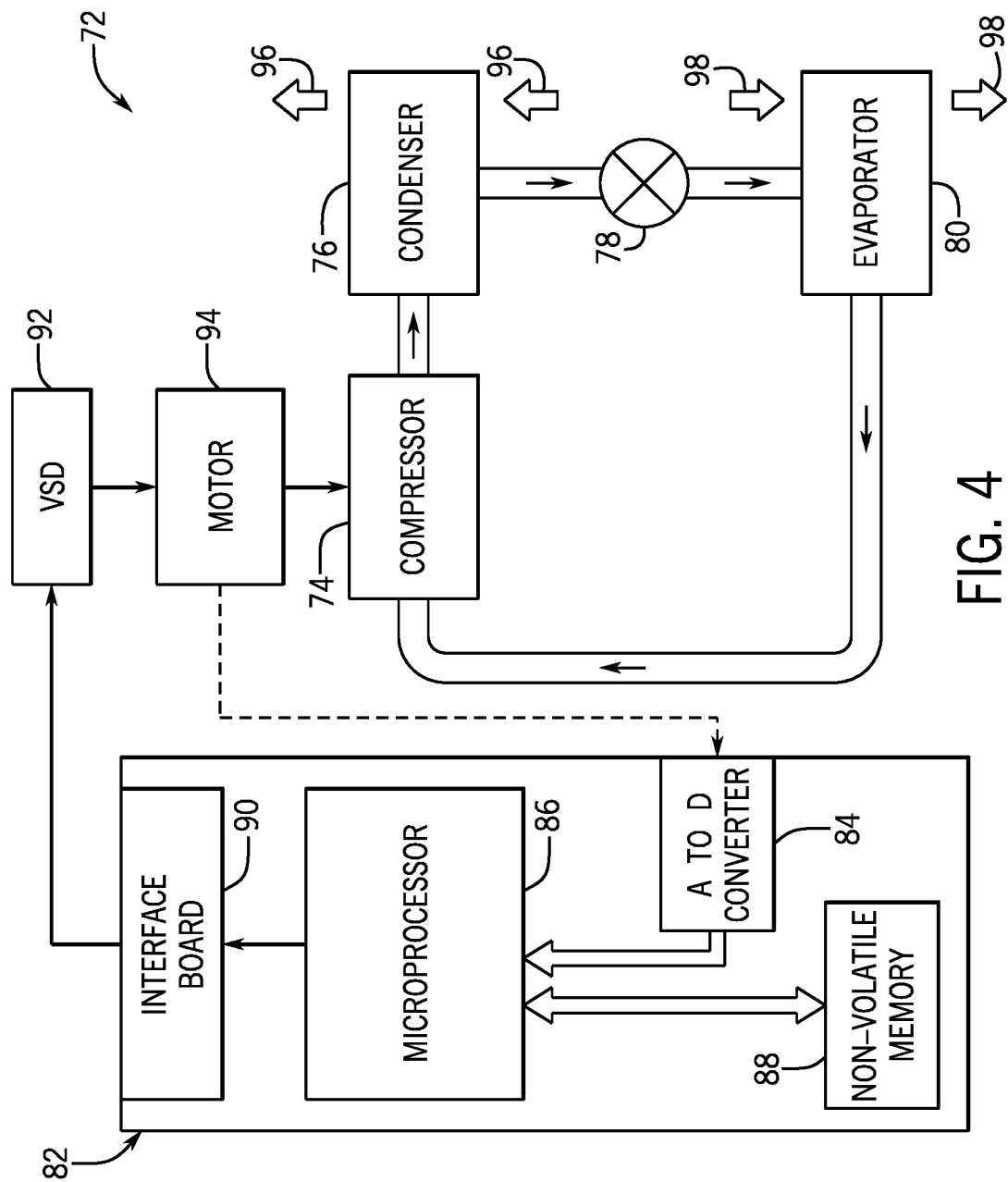
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
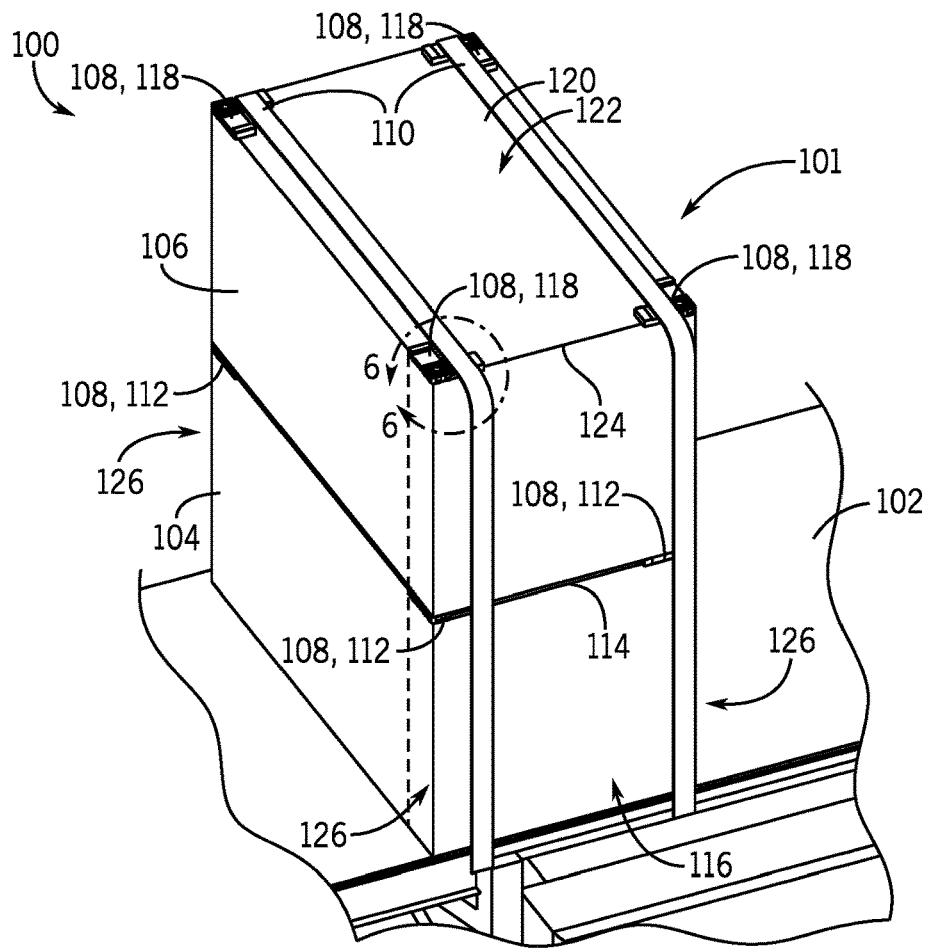
FIG. 5 is a perspective view of an embodiment of a pair of HVAC units that are stacked in a vertical array, in accordance with an aspect of the present disclosure.
Figure 6:
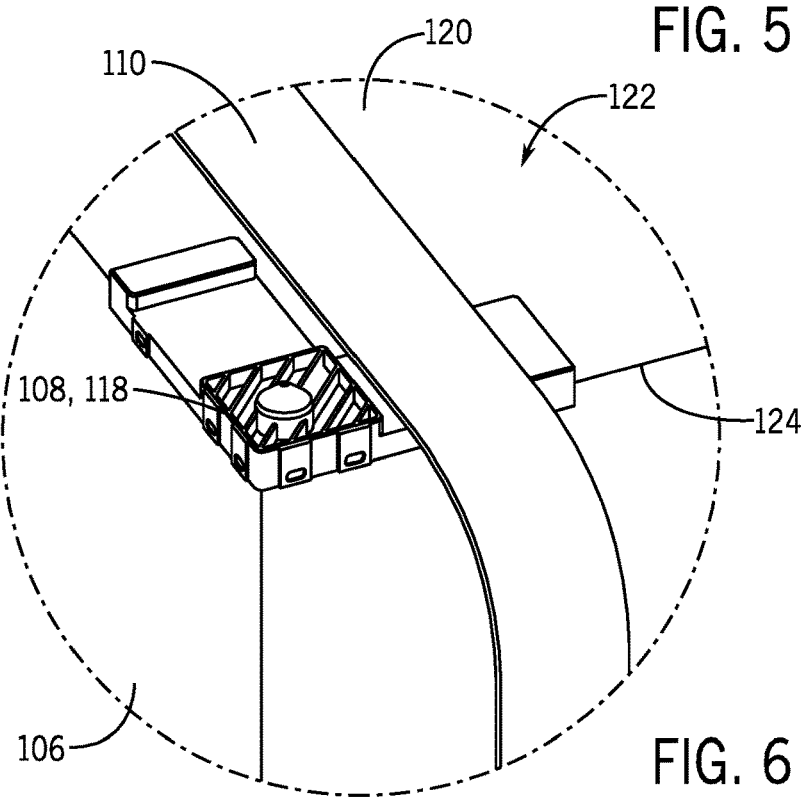
FIG. 6 is an expanded perspective view, taken within line 6-6 of FIG. 6, of an embodiment of a stacking bracket installed on an HVAC unit, in accordance with an aspect of the present disclosure.

As noted above, individual HVAC units 12 are typically mass-produced in a manufacturing facility that may manufacture and assemble hundreds or thousands of HVAC units 12 annually. Upon assembly of the HVAC units 12, the HVAC units 12 may be stacked in vertical arrays or columns, with respect to gravity, to facilitate space-efficient storage of the HVAC units 12 within a warehouse or other storage location of the manufacturing facility. In many cases, groups of vertically stacked HVAC units 12 may be loaded onto a transportation vehicle, such as a tractor trailer assembly, which is configured to transport the HVAC units 12 from the manufacturing facility to a building or other suitable structure for installation. For instance, FIG. 5 is a perspective view of an embodiment of a pair of HVAC units 100 that are stacked in a vertical array 101 on a loading surface 102 of a transportation vehicle with brackets 108 installed with the HVAC units 100, and FIG. 6 is an expanded perspective view, taken within line 6-6 of FIG. 5, illustrating one of the brackets 108 installed on one of the HVAC units 100. FIGS. 5 and 6 are discussed concurrently below.

The pair of HVAC units 100 include a first HVAC unit 104 that is positioned on the loading surface 102 and a second HVAC unit 106 that is positioned on the first HVAC unit 104. As discussed in detail below, embodiments of the present disclosure are directed to spacers or brackets 108 that are configured facilitate vertical stacking of the HVAC units 100 and mitigate translational movement or shifting of the HVAC units 100 relative to one another when the HVAC units 100 are positioned in the vertical array 101. Additionally, the brackets 108 are configured to facilitate securement of the HVAC units 100 to the loading surface 102 via one or more straps 110.

In the illustrated embodiment, the brackets 108 include a first set of brackets 112, which may be coupled to a first top panel 114 of a first enclosure 116 of the first HVAC unit 104, and a second set of brackets 118, which may be coupled to a second top panel 120 of a second enclosure 122 of the second HVAC unit 106. In some embodiments, the first set of brackets 112 may be substantially self-similar to the second set of brackets 118. As discussed in detail below, the first set of brackets 112 may engage with frame rails of the second HVAC unit 106 to substantially block translational movement of the second HVAC unit 106 relative to the first HVAC unit 104, particularly during movement of the transportation vehicle. The second set of brackets 118 may engage with the straps 110 to substantially block translational movement of the straps 110 relative to the vertical array 101, as well as to distribute a force applied by the straps 110 to particular portions of the second enclosure 122.

For example, in some embodiments, the straps 110 may be coupled to the loading surface 102 or other portion of the transportation vehicle and may be operable to apply a compressive force between the loading surface 102 and the HVAC units 100. Accordingly, the straps 110 may secure the HVAC units 100 the loading surface 102 and mitigate translational movement of the vertical array 101 relative to the loading surface 102. The second set of brackets 118 is configured to engage with the straps 110 and to distribute the compressive force generated by the straps 110 to certain portions of the second enclosure 122. In particular, the second set of brackets 118 may be positioned along portions of the second enclosure 122 that are reinforced to suitably receive and support the compressive force that may be generated via the straps 110. Accordingly, the straps 110 do not apply large compressive or tensile forces to portions of the second enclosure 122 that may be ill-suited to support such loads. Further, the second set of brackets 118 may distribute the force(s) applied by the straps 110 to the second top panel 120 over a cross-sectional area of the second set of brackets 118, such that the straps 110 do not apply relatively large forces to a perimeter edge 124 of the second top panel 120. As a result, the second set of brackets 118 may reduce a compressive load applied to the perimeter edge 124 upon application of the straps 110, and thus, ensure that the perimeter edge 124 does not deform or incur wear.

Similar to the second set of brackets 118, the first set of brackets 112 is configured to distribute a compressive force that may be generated by the straps 110, as well as a compressive force generated due to a weight of the second HVAC unit 106, to suitable portions of the first enclosure 116 that are designed to support such loads. For example, as similarly discussed above, the frame rails of the second HVAC unit 106 may rest on the first set of brackets 112 to substantially prevent direct physical contact between the first enclosure 116 and the second enclosure 122. Accordingly, the first set of brackets 112 can transmit a compressive force that may be collectively generated by the straps 110, as well as a weight of the second HVAC unit 106, to designated portions of the first enclosure 116 that are reinforced to support the compressive force, such as corner portions 126 of the first enclosure 116. In this manner, the first set of brackets 112 may substantially mitigate compressive loading and/or tensional loading on certain portions of the first enclosure 116 that may be ill-suited to support such loads. Therefore, the first set of brackets 112 may ensure that the first enclosure 116 is not bent or deformed due to compressive or tensional forces that may be generated by the straps 110 and/or a weight of the second HVAC unit 106 during storage, transportation, and/or handling of the HVAC units 100.

While the illustrated embodiment of FIG. 5 includes two HVAC units 100 stacked in the vertical array 101, it should be noted that, in other embodiments, any suitable quantity of HVAC units 100 may be stacked on the loading surface 102. For example, in some embodiments, 1, 2, 3, 4, 5, or more than five HVAC units 100 may be stacked in the vertical array 101. Moreover, although two straps 110 are shown in the illustrated embodiment, in other embodiments, any suitable quantity of straps 110 may be used to secure the HVAC units 100 to the loading surface 102. For example, in some embodiments, the vertical array 101 may include an additional pair straps that extend across corresponding brackets 108 of the second set of bracket 118 in a direction that is generally orthogonal to an extension direction of the straps 110 shown in FIG. 5.

Figure 7:
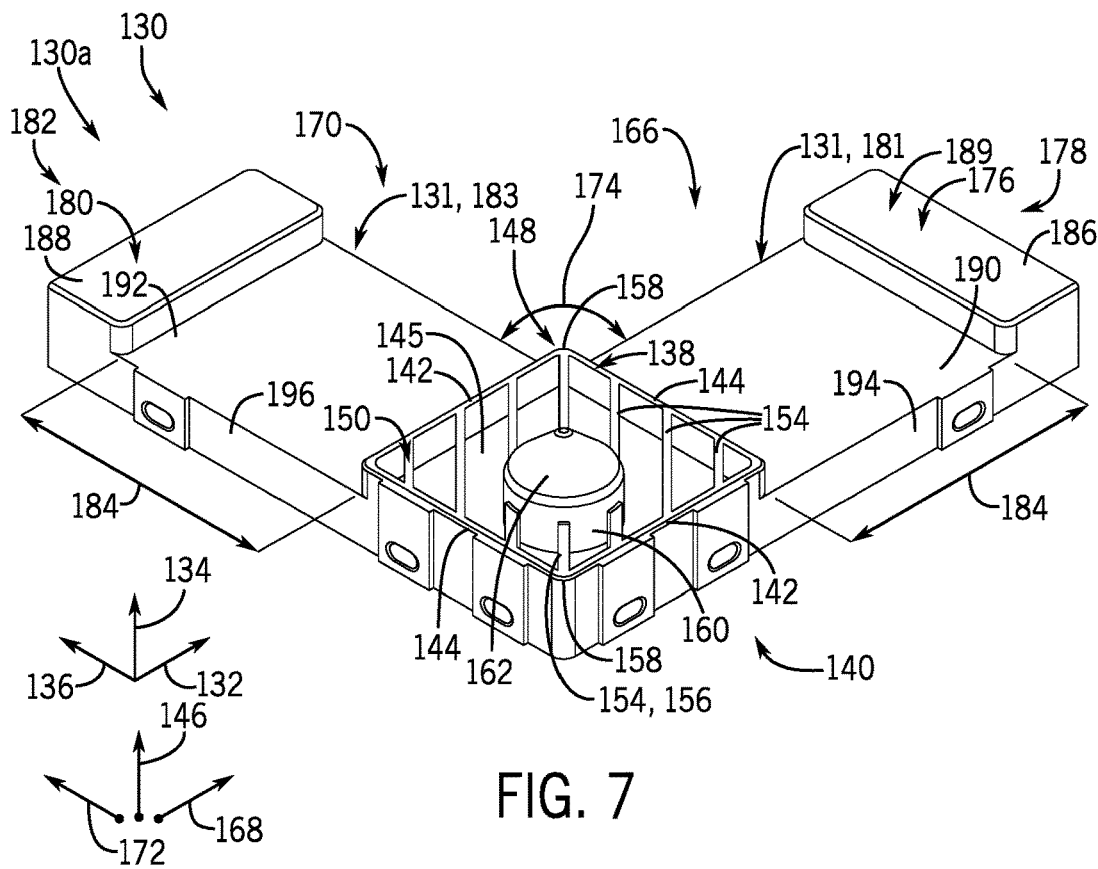
FIG. 7 is a top perspective view of an embodiment of a stacking bracket for an HVAC unit, in accordance with an aspect of the present disclosure.

FIG. 7 is a top perspective view of an embodiment of a corner bracket 130 that may be included in the plurality of brackets 108. Particularly, the illustrated embodiment shows a corner bracket 130a having a pair of strap recesses 131 formed therein, which are each configured to receive one of the straps 110. To facilitate discussion, the corner bracket 130a will be described with reference to a longitudinal axis 132, a vertical axis 134, and a lateral axis 136. As shown in the illustrated embodiment, the corner bracket 130a includes a plurality of walls 138 that extend about a corner portion 140 of the corner bracket 130a. Particularly, the walls 138 may include a first set of walls 142 that extend generally parallel to the longitudinal axis 132 and a second set of walls 144 that extend generally parallel to the lateral axis 136. Accordingly, the walls 138 may extend about a perimeter of the corner portion 140 that, in some embodiments, may include a generally square profile, a generally rectangular profile, or any other suitable geometric profile. The walls 138 extend from an intermediate surface 145 or a base surface of the corner portion 140 in a first direction 146, generally parallel to the vertical axis 134 and thereby define a first raised section 148 of the corner portion 140. A first raised surface 150, or a first raised contact surface, of the first raised section 148 may be defined by distal ends of the walls 138 and may extend generally in a plane that is coplanar with a plane of the intermediate surface 145.

In the illustrated embodiment, the corner portion 140 includes a plurality of stiffening ribs 154 that extend from the intermediate surface 145 in the first direction 146 and span between portions of the walls 138. For example, in some embodiments, the stiffening ribs 154 may each extend generally parallel to a central stiffening rib 156 that spans between opposing corners 158 of the first raised section 148. However, in other embodiments, the stiffening ribs 154 may extend across the intermediate surface 145 in any other suitable manner. For example, in certain embodiments, the stiffening ribs 154 may extend substantially parallel to the lateral axis 136 between the first set of walls 142 and/or may extend substantially parallel to the longitudinal axis 132 between the second set of walls 144. In further embodiments, the corner portion 140 may include a first set of stiffening ribs 154 that extends between the first set of the walls 142 and a second set of stiffening ribs 154 that extends between the second set of the walls 144, where the first set of stiffening ribs 154 and the second set of stiffening ribs 154 intersect one another. In any case, the stiffening ribs 154 may increase a structural rigidity of the corner portion 140 to reduce or substantially mitigate deformation of the corner portion 140 during compressive loading or tensile loading of the corner bracket 130a. In some embodiments, an extension height of the stiffening ribs 154, with respect to the intermediate surface 145, may be substantially equal to an extension height of the walls 142. Accordingly, respective distal ends of the stiffening ribs 154 and the distal ends of the walls 138 may collectively form the first raised surface 150 of the first raised section 148.

In some embodiments, the corner portion 140 may include an alignment protrusion 160 that extends crosswise from the intermediate surface 145 in the first direction 146 and protrudes vertically past the walls 138 and the stiffening ribs 154. The alignment protrusion 160 may include a conical tip 162 that forms an upper end portion of the alignment protrusion 160. As discussed in greater detail below, the alignment protrusion 160 is configured to engage with frame rails of an HVAC unit, such as the second HVAC unit 106, which may be positioned on top of the corner bracket 130a. Accordingly, the alignment protrusion 160 may block lateral movement of the HVAC unit 106 relative to the corner bracket 130a. As shown in the illustrated embodiment, the alignment protrusion 160 may bisect one or more of the stiffening ribs 154, such as the central stiffening rib 156.

The corner bracket 130a includes a first arm 166 that extends from the corner portion 140 in a second direction 168, generally parallel to the longitudinal axis 132, and a second arm 170 that extends from the corner portion 140 in a third direction 172, generally parallel to the lateral axis 136. Indeed, in some embodiments, an angle 174 between the first arm 166 and the second arm 170 may be approximately ninety degrees. As shown in the illustrated embodiment, the first arm 166 includes a second raised section 176 that extends from a first end portion 178 of the first arm 166, and the second arm 170 includes a third raised section 180 that extends from a second end portion 182 of the second arm 170. In some embodiments, the first end portion 178 and the second end portion 182 may define a distal end of the first arm 166 and a distal end of the second arm 170, respectively. That is, in such embodiments, the second raised section 176 may be positioned at a distal end of the first arm 166, and the third raised section 180 may be positioned at a distal end of the second arm 170. However, in other embodiments, the first arm 166 and the second arm 170 may each include an additional portion that extends past the second raised section 176 and the third raised section 180, respectively.

In any case, the second raised section 176 may form a first strap recess 181 of the first arm 166 that extends between the first raised section 148 and the second raised section 176. Similarly, the third raised section 180 may form a second strap recess 183 of the second arm 170 that extends between the first raised section 148 and the third raised section 180. As discussed in detail below, the first strap recess 181 and the second strap recess 183 may be configured to receive one or more of the straps 110 upon installation of the corner bracket 130a on one of the HVAC units 100. In some embodiments, respective widths 184 of the first and second strap recesses 181, 183 may be substantially equal to a width of one of the straps 110. Accordingly, upon positioning of one of the straps 110 within the first strap recess 181, the first strap recess 181 may substantially mitigate translational movement of the strap 110 along the longitudinal axis 132. Similarly, upon positioning of one of the straps 110 within the second strap recess 183, the second strap recess 183 may substantially mitigate translation movement of the strap 110 along the lateral axis 136.

In some embodiments, a second raised surface 186, or a second raised contact surface, of the second raised section 176 and a third raised surface 188, or a third raised contact surface, of the third raised section 180 may be substantially coplanar with the first raised surface 150 of the first raised section 148. Accordingly, the first raised surface 150, the second raised surface 186, and the third raised surface 188 may collectively define a contact surface 189 of the corner bracket 130a. As discussed below, the contact surface 189 may be configured to engage with and support one or more frame rails an HVAC unit that may be positioned atop the corner bracket 130a. In certain embodiments, a first strap surface 190 of the first strap recess 181 and a second strap surface 192 of the second strap recess 183 may be substantially coplanar with the intermediate surface 145 of the corner portion 140.

Figure 8:
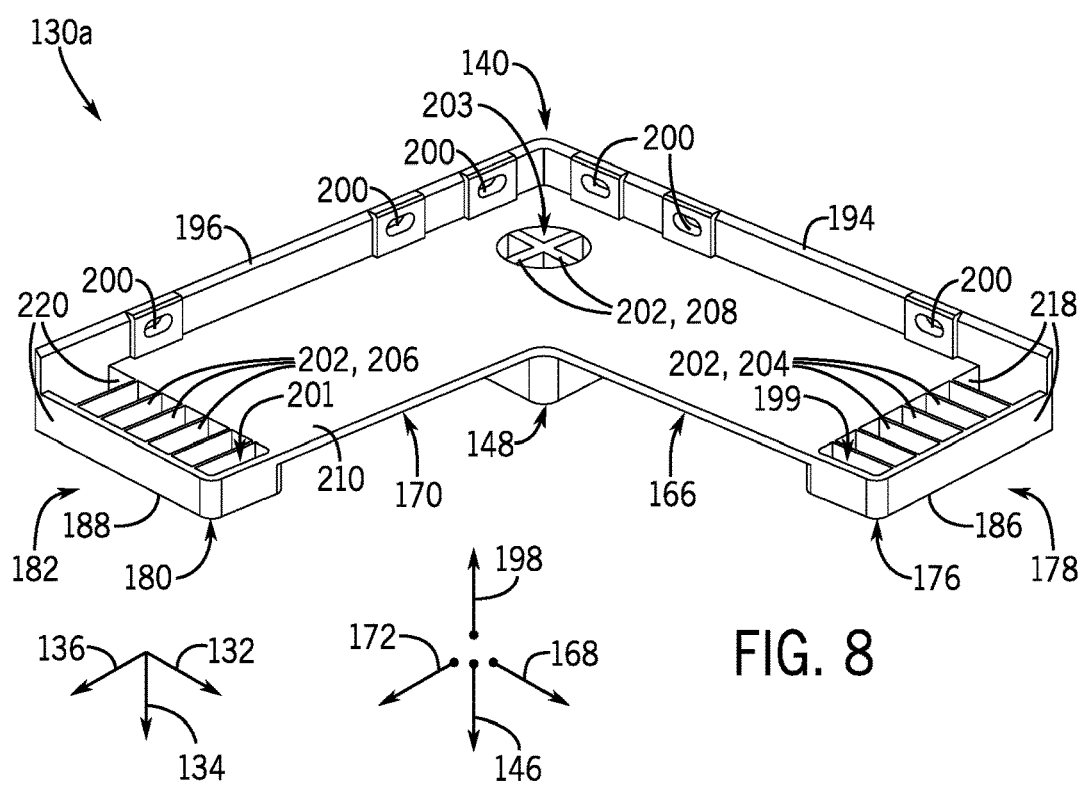
FIG. 8 is a bottom perspective view of an embodiment of a stacking bracket for an HVAC unit, in accordance with an aspect of the present disclosure.

In some embodiments, the corner bracket 130a may include a first flange 194 or lateral portion that extends along a first section of the corner portion 140 and the first arm 166 and a second flange 196 or lateral portion that extends along a second section of the corner portion 140 and the second arm 170. To better illustrate the first and second flanges 194, 196, FIG. 8 is a perspective view of an underside of the corner bracket 130a. As shown in the illustrated embodiment, the first and second flanges 194, 196 may extend from the corner bracket 130a in a fourth direction 198, which extends generally parallel to the vertical axis 134 and generally opposite to the first direction 146. As discussed in detail below, the first and second flanges 194, 196 may enable the corner bracket 130a to couple to the top panel 114 of the first HVAC unit 104 or to the top panel 120 of the second HVAC unit 106. Indeed, the first flange 194 and the second flange 196 may each include one or more apertures 200 formed therein, which enable suitable fasteners, such as screws, bolts, friction pins, or the like, to couple the corner bracket 130a to one of the top panels 114, 120 of the HVAC units 104, 106. In other words, respective fasteners may extend through the apertures 200 and into one of the top panels 114, 120 of the HVAC units 104, 106 to secure the corner bracket 130a to the one of HVAC units 104, 106 in an installed position. In some embodiments, the apertures 200 may include an elongated profile or an oval profile, which may facilitate alignment of the apertures 200 with respective mounting apertures defined within one of the top panels 114, 120 of the HVAC units 104, 106.

In some embodiments, the second raised section 176, the third raised section 180, and the alignment protrusion 160 may each include a hollow interior region that includes one or more stiffening ribs 202 extending thereacross. For example, the second raised section 176 may include a first set of stiffening ribs 204 that extends from the second raised surface 186 in the fourth direction 198 and spans across a hollow interior region 199 of the second raised section 176 between opposing walls 218 of the second raised section 176. Similarly, the third raised section 180 may include a second set of stiffening ribs 206 that extends from the third raised surface 188 and spans across a hollow interior region 201 of the third raised section 180 between opposing walls 220 of the third raised section 180. The alignment protrusion 160 may include intersecting stiffening ribs 208 that extend along a hollow interior region 203 of the alignment protrusion 160 from the conical tip 162 to a lower surface 210 of the corner bracket 130a. That is, the stiffening ribs 208 may extend along the hollow interior region 203 between diametric sides of an interior surface of the alignment protrusion 160. The stiffening ribs 202, 204, 208 may enhance a structural rigidity of the second raised section 176, the third raised section 180, and the alignment protrusion 160, respectively.

Figure 9:
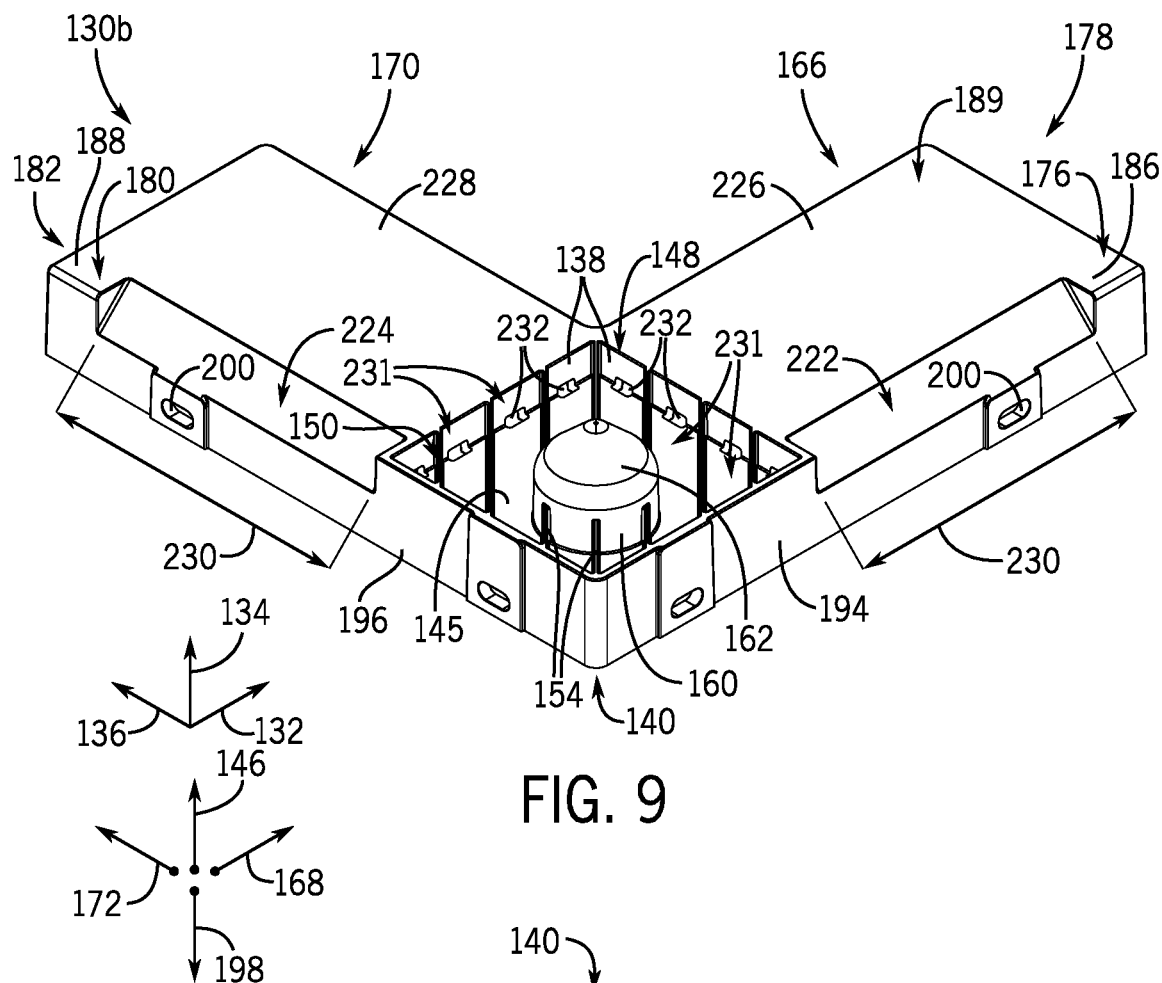
FIG. 9 is a top perspective view of an embodiment of a stacking bracket having strap chamfers, in accordance with an aspect of the present disclosure.

FIG. 9 is a perspective view of another embodiment of the corner bracket 130. In particular, the illustrated embodiment shows a corner bracket 130b having a first strap chamfer 222 and a second strap chamfer 224 instead of the first strap recess 181 and the second strap recess 183, respectively. It should be noted that, in some embodiments, the corner bracket 130b may include certain features or sections that may be substantially similar to features or sections of corner bracket 130a discussed above. Accordingly, for consistency, reference numerals associated with certain features of the corner bracket 130a may be used to identify self-similar features of the corner bracket 130b in later discussion.

As shown in the illustrated embodiment, the corner bracket 130b includes a first strap surface 226 that extends from the first raised surface 150 of the first raised section 148 to the second raised surface 186 of the second raised section 176, where the first strap surface 226 is substantially coplanar with the first raised surface 150 and the second raised surface 186. Further, the corner bracket 130b includes a second strap surface 228 that extends from the first raised surface 150 to the third raised surface 188 of the third raised section 180, where the second strap surface 228 is substantially coplanar with the first raised surface 150 and the third raised surface 188. Accordingly, the first, second, and third raised surfaces 150, 186, 188 and the first and second strap surfaces 226, 228 collectively define the contact surface 189 of the corner bracket 130*b*.

In some embodiments, the first strap chamfer 222 extends between the first strap surface 226 and the first flange 194, and the second strap chamfer 224 extends between the second strap surface 228 an the second flange 196. The first strap chamfer 222 is configured to receive one of the straps 110 along the lateral axis 136, such that the strap 110 may extend across the first strap chamfer 222 and the first strap surface 226 in the third direction 172. The second strap chamfer 224 is configured to receive one of the straps 110 along the longitudinal axis 132, such that the strap 110 may extend across the second strap chamfer 224 and the second strap surface 228 in the second direction 168. Similar to the first and second strap recesses 181, 183 discussed above, the first and second strap chamfers 222, 224 may each include a respective width 230 that is substantially equal to a width of one of the straps 110. Accordingly, upon engagement with one or the straps 110, the first strap chamfer 222 may substantially block translational movement of the strap 110 relative to the corner bracket 130*b* along the longitudinal axis 132. Similarly, upon engagement with one of the straps 110, the second strap chamfer 224 may substantially block translational movement of the strap 110 relative to the corner bracket 130*b* along the lateral axis 136. Although the first and second strap chamfers 222, 224 are shown as having a generally linear profile in the illustrated embodiment, it should be noted that in other embodiments, the first and second strap chamfers 222, 224 may include any other suitable profile or contour. For example, in some embodiments, the first strap chamfer 222, the second strap chamfer 224, or both, may include a generally curved or rounded profile.

The stiffening ribs 154 may form a plurality of pockets 231 that are positioned within the first raised section 148 and span between adjacent stiffening ribs 154. In some embodiments, the corner bracket 130*b* may include respective passages 232 that are each in fluid communication with a corresponding one of the pockets 231. Particularly, the passages 232 may extend from the intermediate surface 145, the walls 138, or both, to the lower surface 210 of the corner bracket 130*b*. In this manner, the passages 232 may enable condensation, precipitation, or other fluid that may accumulate within the pockets 231 during handling or transportation of the HVAC units 100 to drain from the pockets 231 and away from the corner bracket 130*b*. It should be appreciated that any of the corner brackets 130 discussed herein may include the passages 232.

Figure 10:
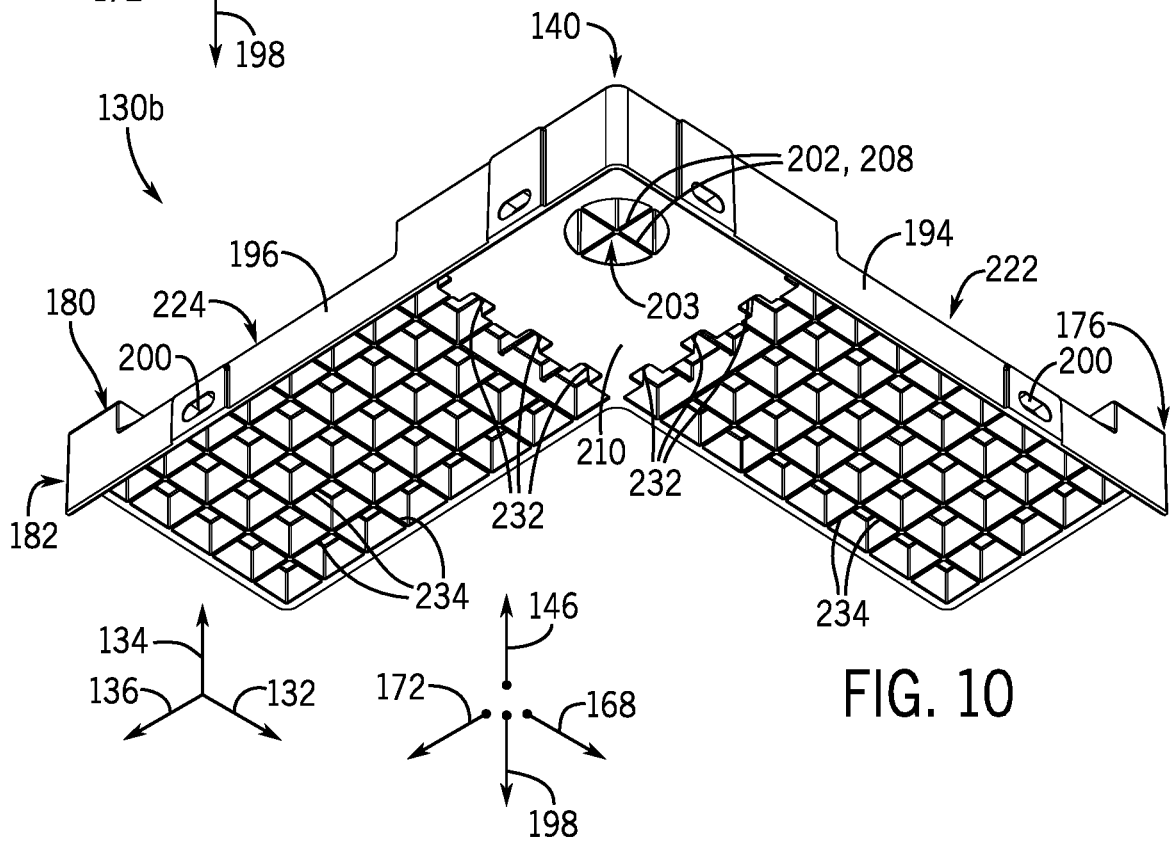
FIG. 10 is a bottom perspective view of an embodiment of a stacking bracket having strap chamfers, in accordance with an aspect of the present disclosure.

FIG. 10 is a perspective view of an underside of the corner bracket 130*b*. In some embodiments, the corner bracket 130*b* includes a plurality of lower stiffening ribs 234 that extend from the first strap surface 226 and the second strap surface 228 in the fourth direction 198. Particularly, as shown in the illustrated embodiment, the lower stiffening ribs 234 may include a first set of lower stiffening ribs 234 that extends along the corner bracket 130*b* in the second direction 168, and second set of lower stiffening ribs 234 that extends along the corner bracket 130*b* in the third direction 172. Accordingly, the lower stiffening ribs 234 may form an intersecting matrix of stiffening ribs that extends along the underside of the corner bracket 130*b*. In some embodiments, respective distal ends of the lower stiffening ribs 234 may be substantially coplanar with the lower surface 210, and thus, may form a portion of the lower surface 210. As will be appreciated, inclusion of the lower stiffening ribs 234 with the corner bracket 130*b* may reduce a weight and manufacturing cost of the corner bracket 130*b*, while maintaining a desired rigidity or structural stiffness of the corner bracket 130*b*.

Figure 11:
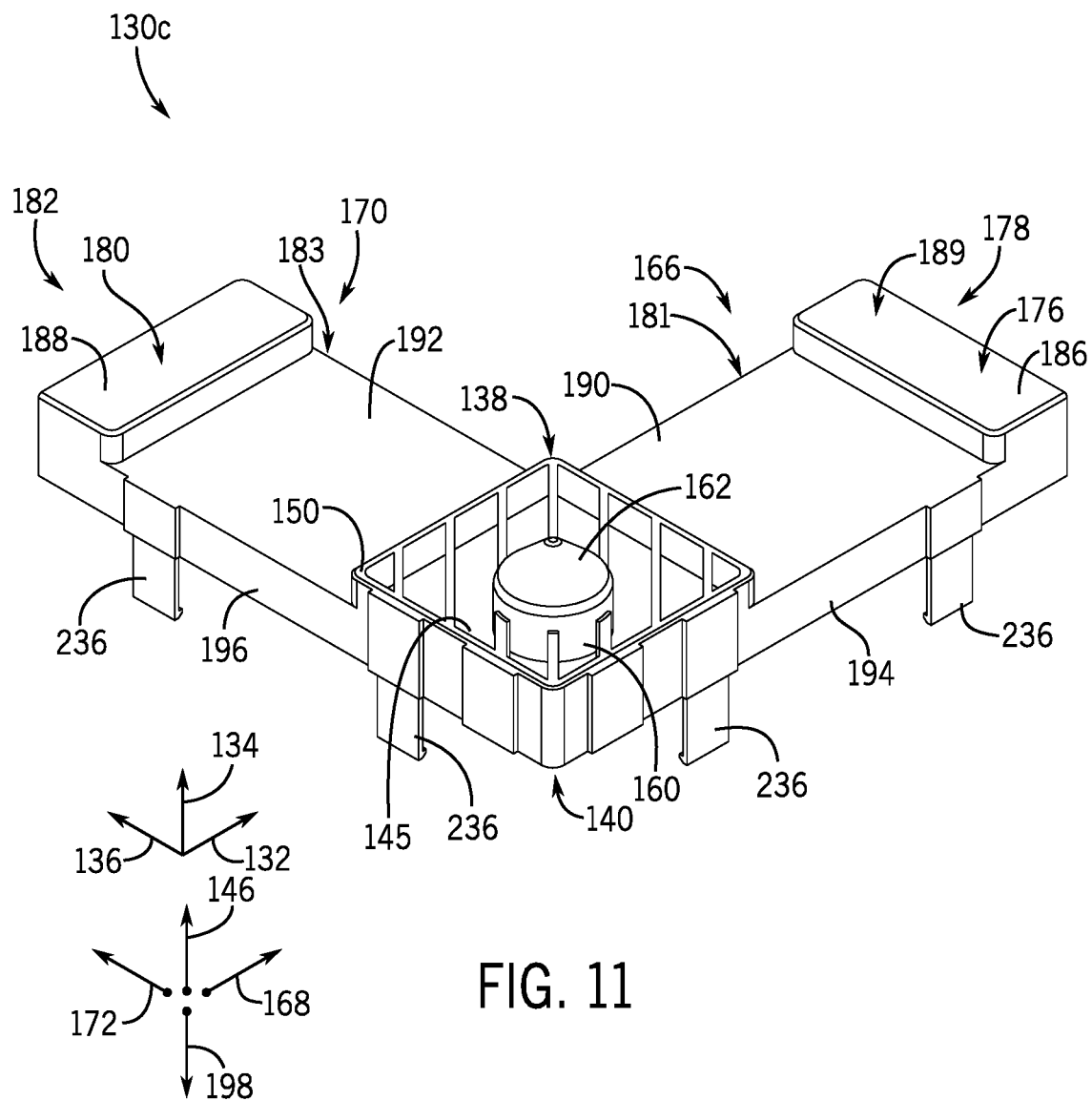
FIG. 11 is a perspective view of an embodiment of a stacking bracket having mounting hooks, in accordance with an aspect of the present disclosure.

FIG. 11 is a perspective view of another embodiment of the corner bracket 130. In particular, the illustrated embodiment shows a corner bracket 130*c* having a plurality of hooks 236 that extends from the corner bracket 130*c* and is configured to couple the corner bracket 130*c* to one of the HVAC units 100. It should be noted that, in some embodiments, the corner bracket 130*c* may include certain features or sections that may be substantially similar to features or sections of corner brackets 130*a*, 130*b* discussed above. Accordingly, for consistency, reference numerals associated with certain features of the corner brackets 130*a*, 130*b* may be used to identify self-similar features of the corner bracket 130*c* in later discussion.

As shown in the illustrated embodiment, the hooks 236 may extend from the first and second flanges 194, 196 in the fourth direction 198. As discussed in detail below, the hooks 236 are configured to engage with the top panels 114, 120 or other structural member of the first and second HVAC units 104, 106 and thereby couple the corner bracket 130*c* to the first HVAC unit 104 or the second HVAC unit 106. Particularly, the hooks 236 may couple the corner bracket 130*c* to, for example, the first top panel 114, via a snap-connection or a compression fit that is generated between the hooks 236 and a side wall of the first top panel 114. As such, in some embodiments, the apertures 200 included in the corner brackets 130*a*, 130*b* may be omitted from the corner bracket 130*c*. Indeed, the hooks 236 may be used in lieu of dedicated fasteners to couple to the corner bracket 130*c* to one of the HVAC units 100. However, in certain embodiments, the corner bracket 130*c* may include both the hooks 236 and the apertures 200. Although the first flange 194 and the second flange 196 each include two hooks 236 in the illustrated embodiment, it should be noted that, in other embodiments, the first and second flanges 194, 196 may each include any suitable quantity of hooks 236. For example, the first flange 194, the second flange 196, or both, may each include 1, 2, 3, 4, 5, or more than five of the hooks 236.

Figure 12:
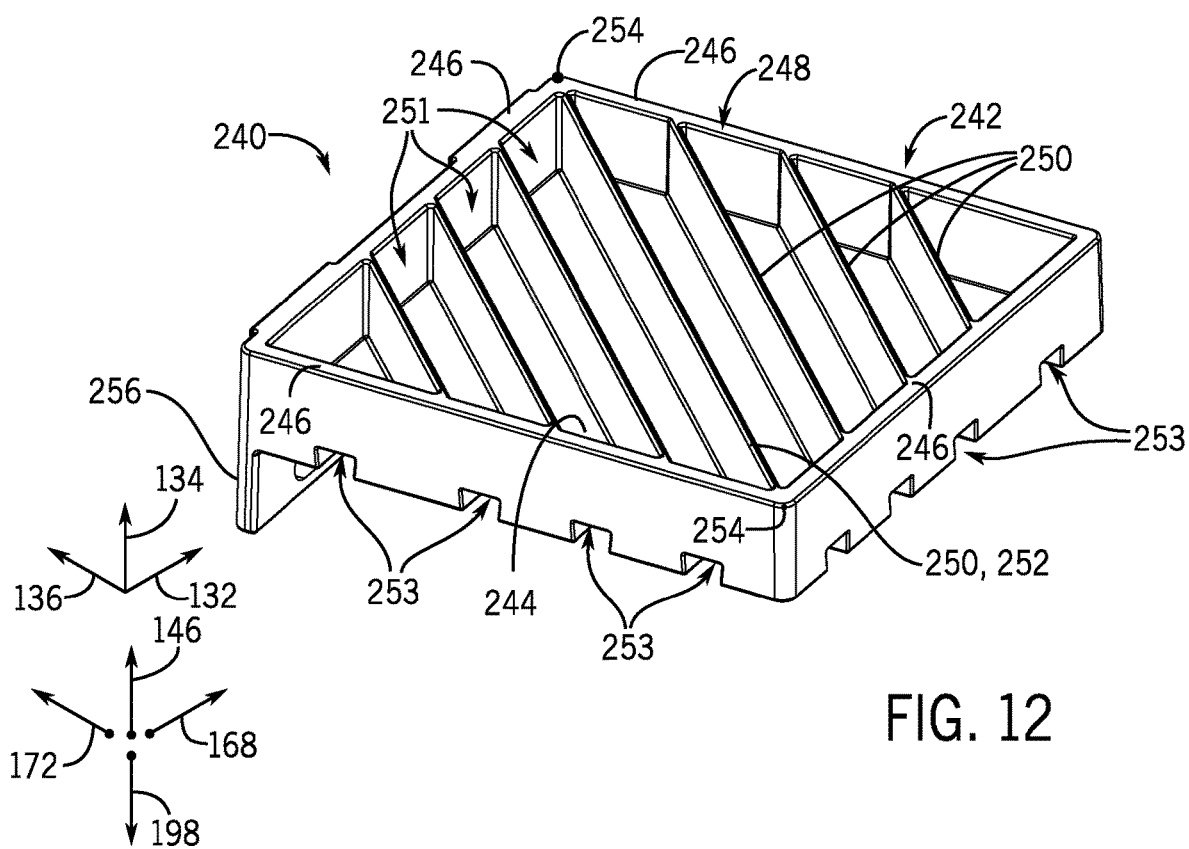
FIG. 12 is a top perspective view of an embodiment of a stacking bracket for an HVAC unit, in accordance with an aspect of the present disclosure.

FIG. 12 is a perspective view of a center bracket 240 that may be included in the plurality of brackets 108. Particularly, as discussed in detail below, the center bracket 240 may be used in addition to, or in lieu of, the corner brackets 130*a*, 130*b*, 130*c* to facilitate vertical stacking of the HVAC units 100. As shown in the illustrated embodiment, the center bracket 240 includes a body portion 242 that is defined by a body panel 244. In some embodiments, a plurality of walls 246 may span about a perimeter of the body panel 244 and extend from the body panel 244 in the first direction 146. Accordingly, respective distal ends of the walls 246 may form a portion of a contact surface 248 of the center bracket 240 which, as discussed below, is configured to engage with one or more frame rails of an HVAC unit that may be positioned atop the center bracket 240. Although the center bracket 240 has a generally square profile in the illustrated embodiment, in other embodiments, the center bracket 240 may include another quadrilateral profile or any other suitable geometric profile.

In the illustrated embodiment, the center bracket 240 includes a plurality of stiffening ribs 250 that extends from the body panel 244 in the first direction 146 and spans between one or more of the walls 246. For example, in some embodiments, the stiffening ribs 250 may each extend generally parallel to a central stiffening rib 252 that spans between opposing corners 254 of the center bracket 240. However, in other embodiments, the stiffening ribs 250 may extend across the body panel 244 in any other suitable manner. For example, in certain embodiments, the stiffening ribs 250 may extend substantially parallel to the lateral axis 136 between a first opposing set of the walls 246 or may extend substantially parallel to the longitudinal axis 132 between a second opposing set of the walls 246. Additionally or alternatively, the stiffening ribs 250 may extend between the walls 246 in any other suitable manner and, in some embodiments, may intersect one another. In any case, similar to the stiffening ribs 154 of the corner bracket 130a discussed above, the stiffening ribs 250 of the center bracket 240 may increase a structural rigidity of the center bracket 240 and thereby reduce or substantially mitigate deformation of the center bracket 240 during compressive loading or tensile loading of the center bracket 240. In some embodiments, an extension height of the stiffening ribs 250, with respect to the body panel 244, may be substantially equal to an extension height of the walls 246. Accordingly, distal ends of the stiffening ribs 250 and the distal ends of the walls 246 may collectively form the contact surface 248 of the center bracket 240.

The stiffening ribs 250 may form a plurality of pockets 251 that is positioned within the body portion 242 and spans between adjacent stiffening ribs 250. In some embodiments, the center bracket 240 may include passages 253 that are each in fluid communication with a corresponding one of the pockets 251 and extend through the body panel 244, the walls 246, or both. In this manner, the passages 253 may enable condensation, precipitation, or other fluid that may accumulate within the pockets 251 during handling or transportation of the HVAC units 100 to drain from the pockets 251 via the passages 253.

Figure 13:
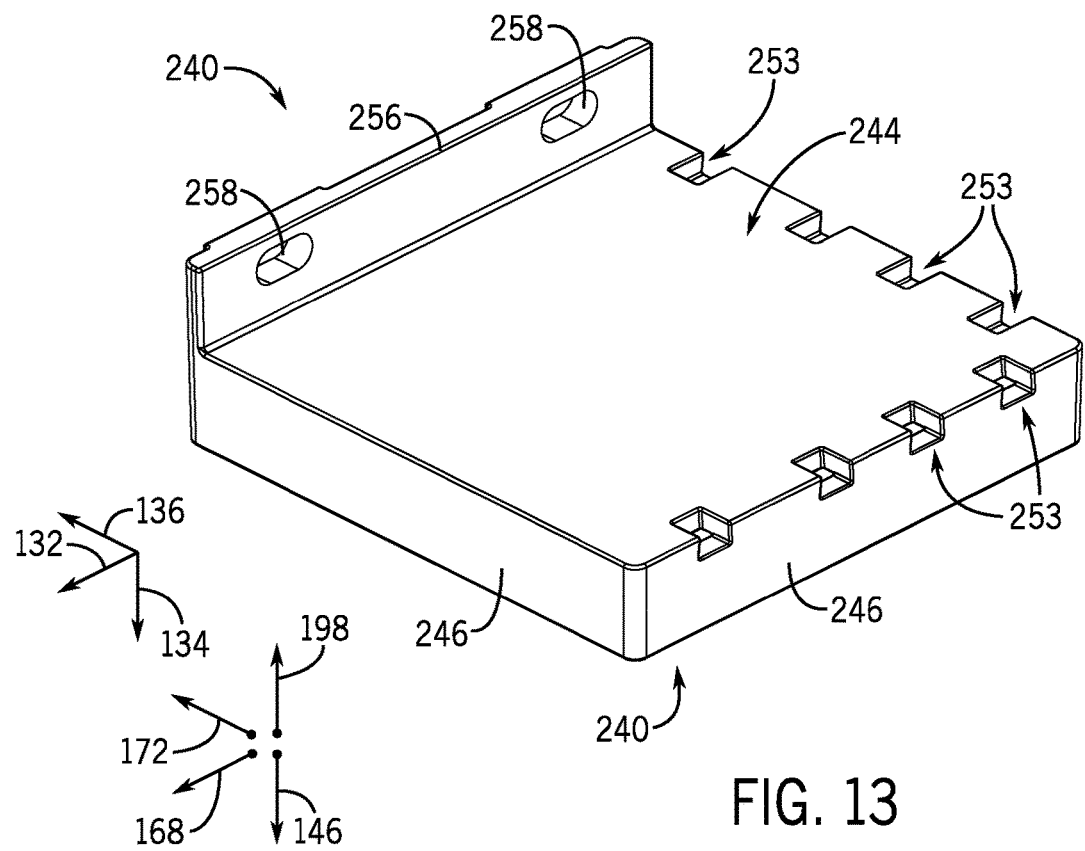
FIG. 13 is bottom perspective view of an embodiment of a stacking bracket for an HVAC unit, in accordance with an aspect of the present disclosure.

The center bracket 240 may also include a flange 256 that extends from the body panel 244 in the fourth direction 198. To better illustrate the flange 256, FIG. 13 is a perspective view of an underside of the center bracket 240. As shown in the illustrated embodiment, the flange 256 includes one or more apertures 258 formed therein, which enables suitable fasteners to couple the center bracket 240 to the top panel 114, 120 of one the HVAC units 100. In some embodiments, the apertures 258 may include an elongated profile or an oval profile to facilitate alignment of the apertures 258 with respective mounting apertures defined within the top panel 114, 120.

Figure 14:
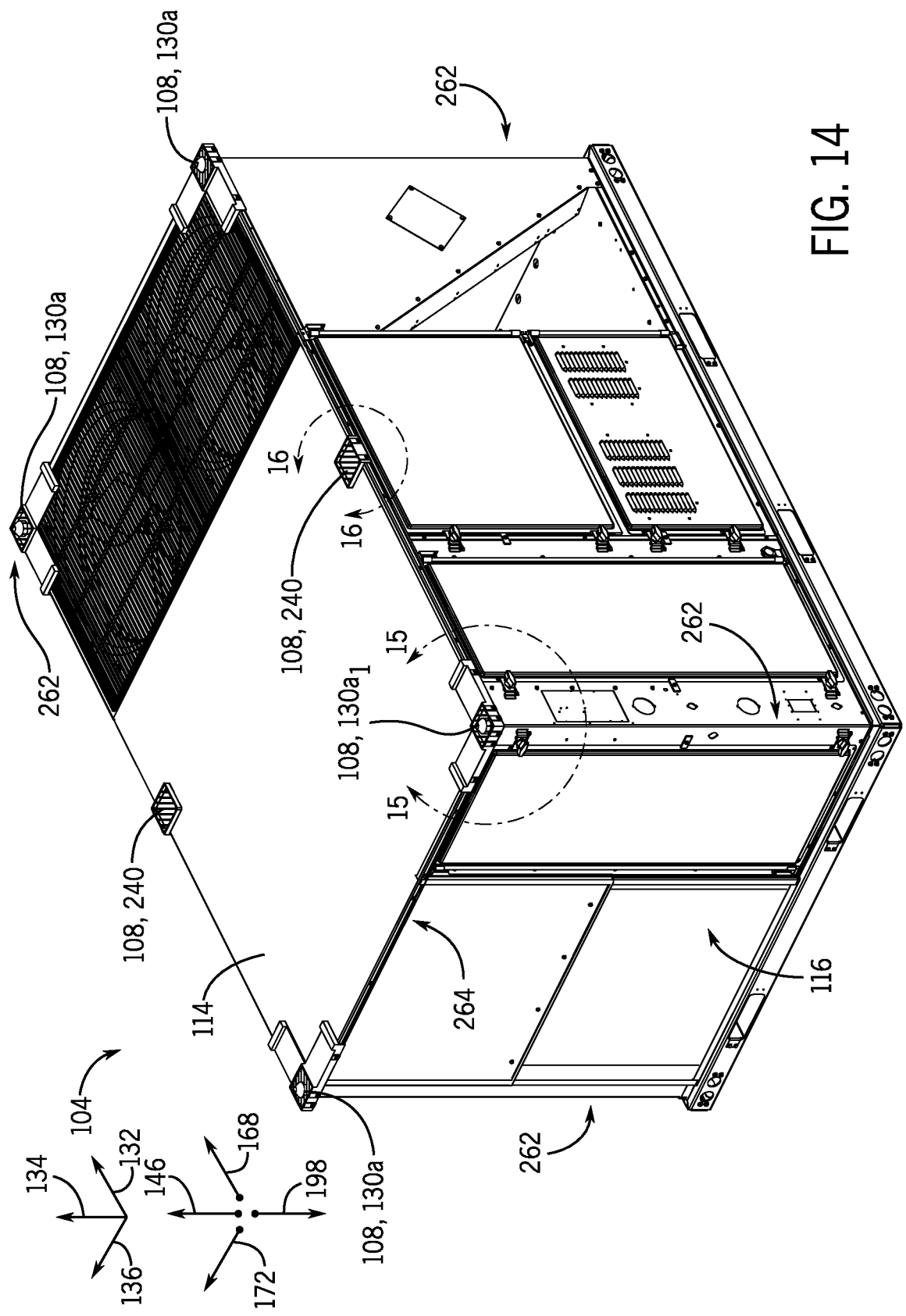
FIG. 14 is a perspective view of an embodiment of an HVAC unit having stacking brackets in an installed configuration, in accordance with an aspect of the present disclosure.
Figure 15:
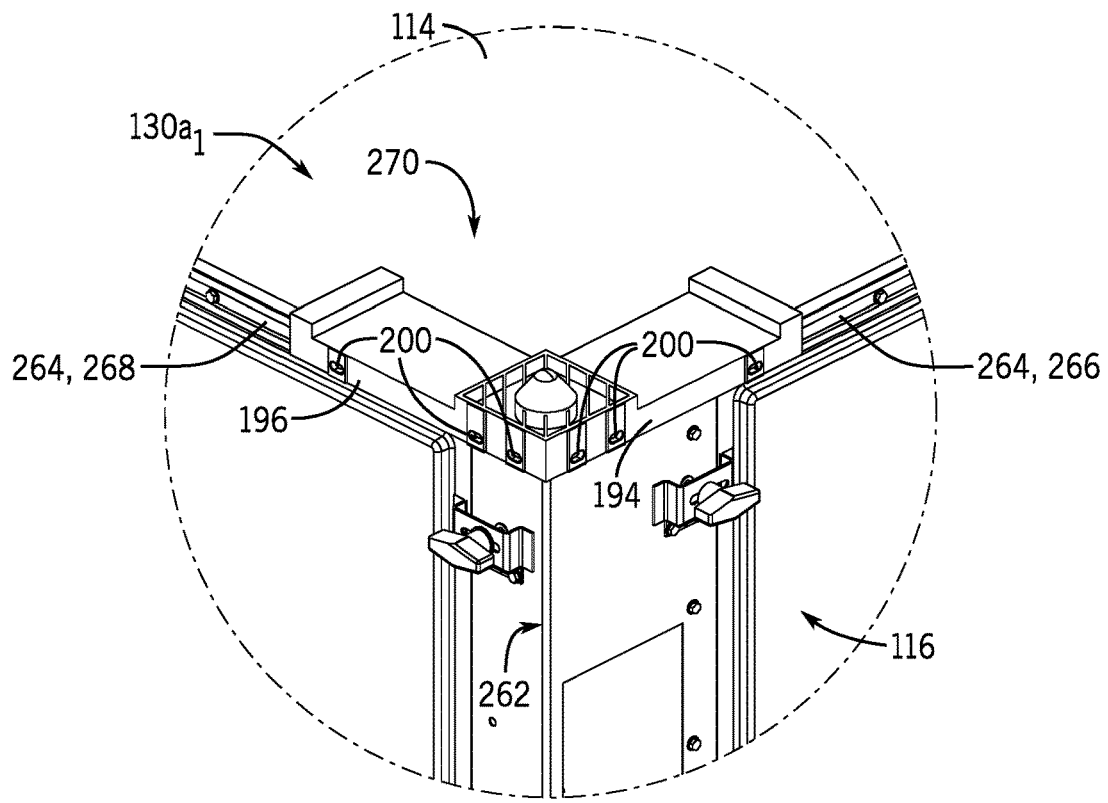
FIG. 15 is an expanded perspective view, taken within line 15-15 of FIG. 14, of an embodiment of a stacking bracket, in accordance with an aspect of the present disclosure.
Figure 16:
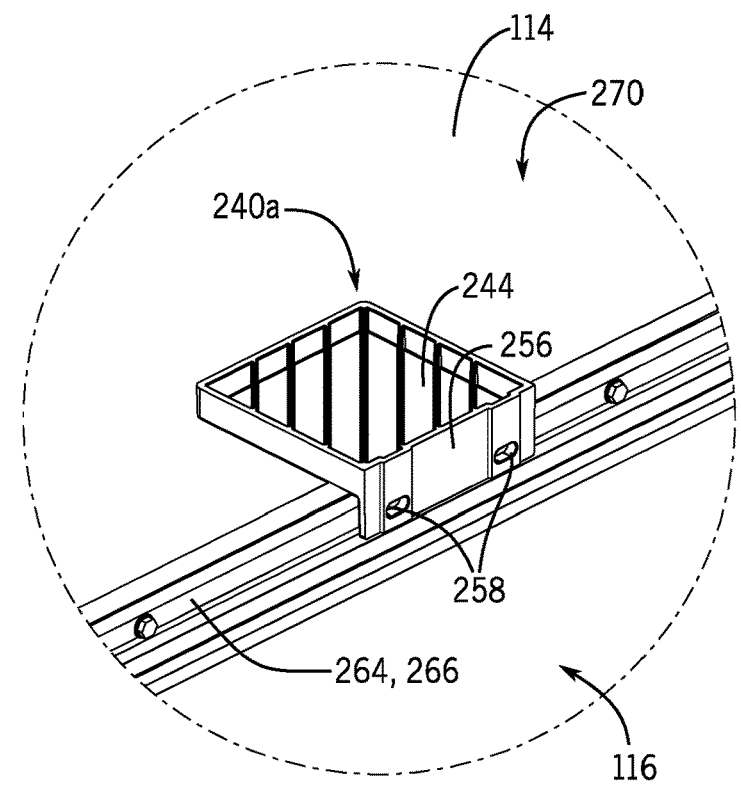
FIG. 16 is an expanded perspective view, taken within line 16-16 of FIG. 14, of an embodiment of a stacking bracket, in accordance with an aspect of the present disclosure.

FIG. 14 is a perspective view of the first HVAC unit 104, illustrating the engagement between the brackets 108 and the first top panel 114 of the first enclosure 116. Additionally, FIG. 15 is an expanded perspective view, taken within line 15-15 of FIG. 14, of one of the corner brackets 130a engaged with the first top panel 114, and FIG. 16 is an expanded perspective view, taken within line 16-16 of FIG. 14, of one of the center brackets 240a engaged with the first top panel 114. FIGS. 14-16 are discussed concurrently below.

In the illustrated embodiment, four corner brackets 130a are coupled to the first top panel 114 and are positioned vertically above respective corner portions 262 of the first enclosure 116. In some embodiments, the corner portions 262 may include portions of the first enclosure 116 that are reinforced to support a weight of the second HVAC unit 106 which, as discussed in detail below, may be positioned on top of the corner brackets 130a. Accordingly, the first and second HVAC units 104, 106 may be stacked in the vertical array 101 with reduced risk of deforming the first enclosure 116 or imparting wear on the first enclosure 116. That is, the corner brackets 130a may transmit compressive force(s) that may be generated by the weight of the second HVAC unit 106 and/or application of the straps 110 to particular portions of the first enclosure 116 suitable to support such loads, such as the corner portions 262.

The first top panel 114 may include a plurality of side walls 264 that span about a perimeter of the first top panel 114 and extend from the first top panel 114 in the fourth direction 198. Respective first flanges 194 and respective second flanges 196 of the corner brackets 130a may be configured to abut adjoining side walls 264 of the first top panel 114, and thus, enable suitable fasteners to couple the first and second flanges 194, 196 to corresponding ones of the side walls 264.

For example, as shown in FIG. 15, in an installed configuration of a first corner bracket $130a_1$, the first flange 194 of the first corner bracket $130a_1$ may abut a first side wall 266 of the side walls 264, while the second flange 196 of the first corner bracket $130a_1$ may abut a second side wall 268 of the side walls 264, where the first side wall 266 and the second side wall 268 are adjacent to one another at one of the corner portions 262 of the first HVAC unit 114. Accordingly, in the installed configuration of the first corner bracket $130a_1$, the lower surface 210 of the first corner bracket $130a_1$ may rest on an upper surface 270 of the first top panel 114. Further, the first corner bracket $130a_1$ may be positioned to enable alignment of the apertures 200 with corresponding fastener apertures formed within the first side wall 266 and the second side wall 268 of the first top panel 114. Accordingly, suitable fasteners may be used to couple the first corner bracket $130a_1$ to the first top panel 114. It should be understood that the remaining corner brackets 130a shown in FIG. 14 may couple to respective side walls 264 of the first top panel 114 in a substantially similar manner as the first corner bracket $130a_1$. Moreover, in some embodiments, one or more of the corner brackets 130b and/or the corner brackets 130c may be coupled to the top panel 114 in lieu of respective corner brackets 130a, as discussed in detail below.

In the illustrated embodiment of FIG. 14, the first HVAC unit 104 also includes a pair center brackets 240 that are coupled to the first top panel 114 in addition to the corner brackets 130a. As with the corner brackets 130a, the center brackets 240 may be configured to engage with frame rails of the second HVAC unit 106 to transmit a compressive force that may be generated due to a weight of the second HVAC unit 106 and/or application of the straps 110 to designated portions of the first enclosure 116 when the first and second HVAC units 104, 106 are positioned in the vertical array 101. Indeed, in certain embodiments, the center brackets 240 may be positioned vertically above reinforced portions of the first enclosure 116 to ensure that a force applied by the second HVAC unit 106 is transmitted to such reinforced portions of the first enclosure 116 via the center brackets 240.

Similar to the corner brackets 130a, the center brackets 240 may couple to respective side walls 264 of the first top panel 114. As an example and as shown in FIG. 16, in an installed positioned of a first center bracket 240a, the flange 256 of the first center bracket 240a may abut an exterior surface of the first side wall 266, while the body panel 244 of the first center bracket 240a rests on the upper surface 270 of the first top panel 114. In this installed position, the apertures 258 may align with corresponding fastener apertures formed within the first side wall 266, and thus, enable suitable fasteners to couple the first center bracket 240a to the first top panel 114. It should be understood that additional center brackets 240 may be coupled to corresponding side walls 264 of the first top panel 114 in a substantially similar manner as the first center bracket 240a.

Figure 17:
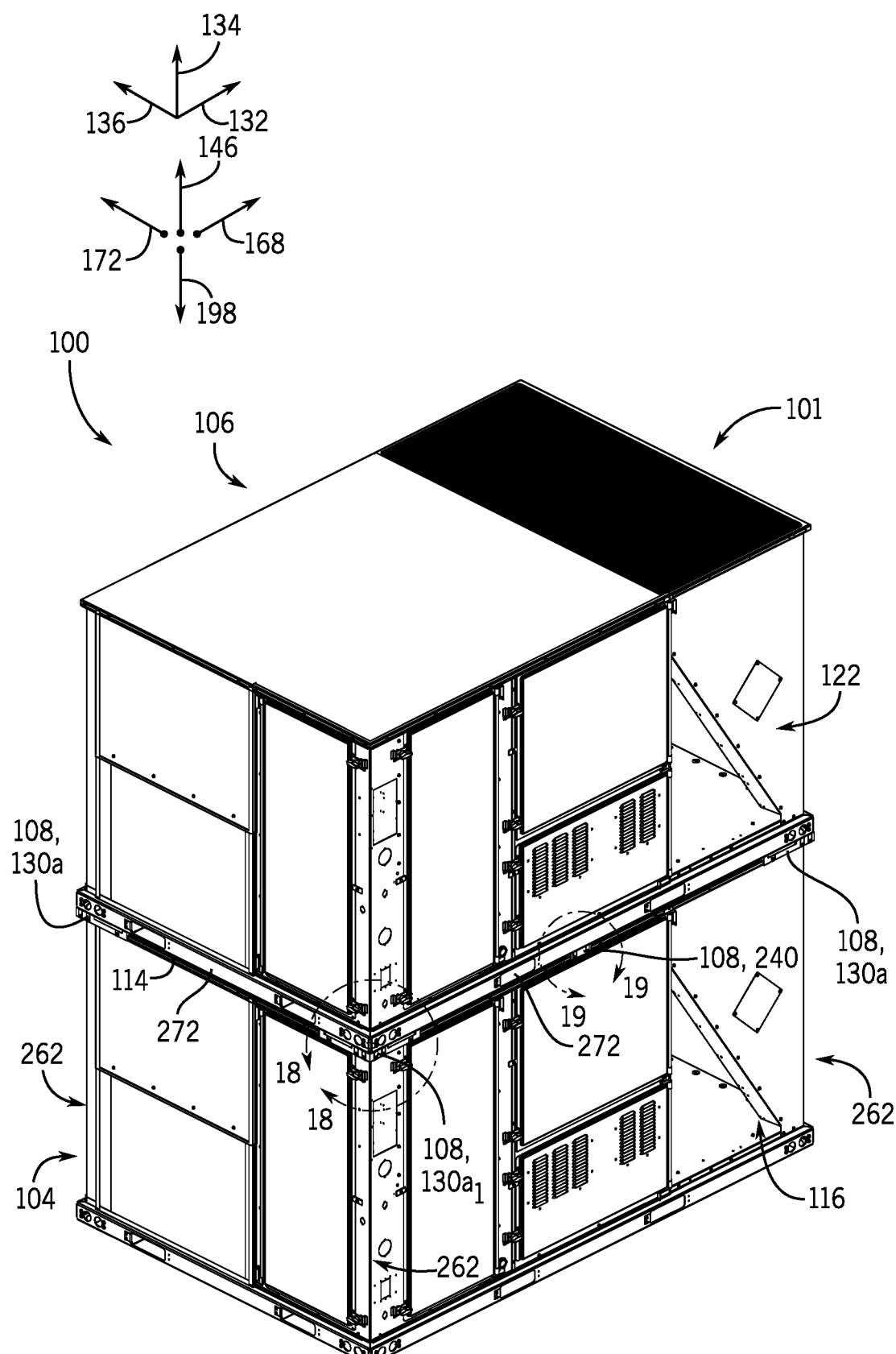
FIG. 17 is a perspective view of an embodiment of a vertical array of HVAC units having stacking brackets in an installed configuration, in accordance with an aspect of the present disclosure.
Figure 18:
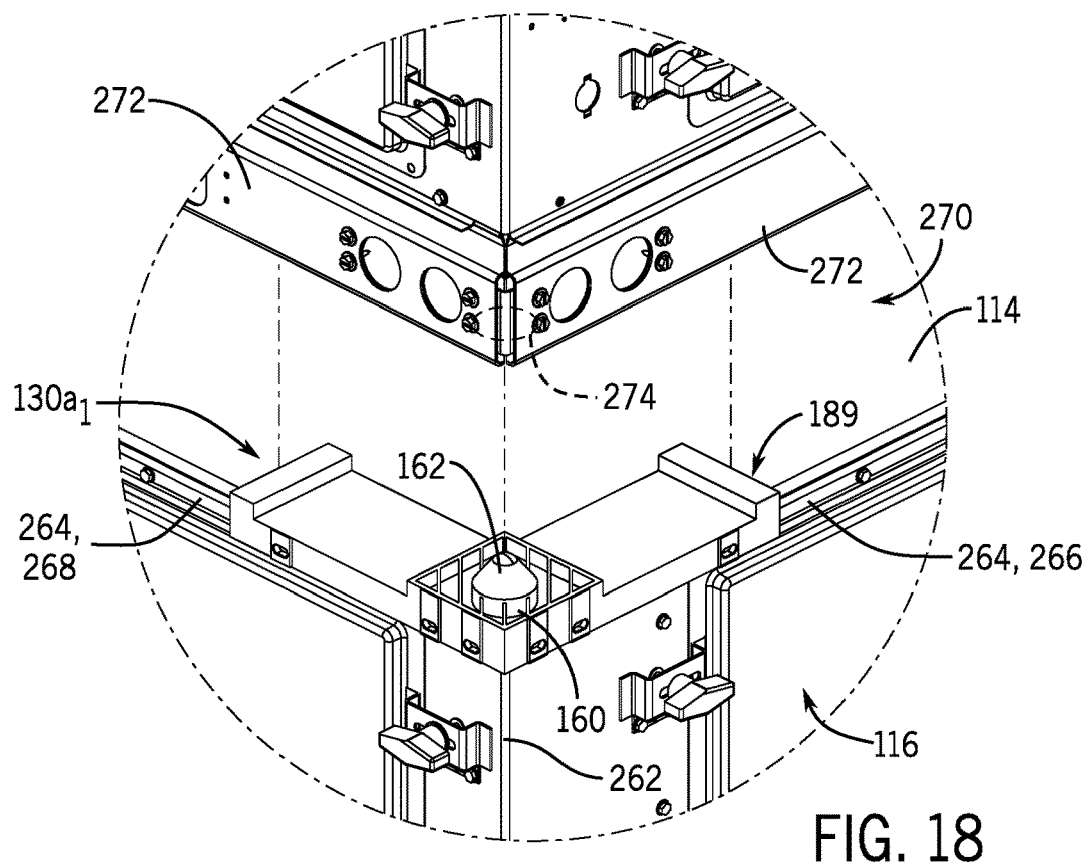
FIG. 18 is an expanded perspective view, taken within line 18-18 of FIG. 17, of an embodiment of an HVAC unit base rail positioned over a stacking bracket, in accordance with an aspect of the present disclosure.
Figure 19:
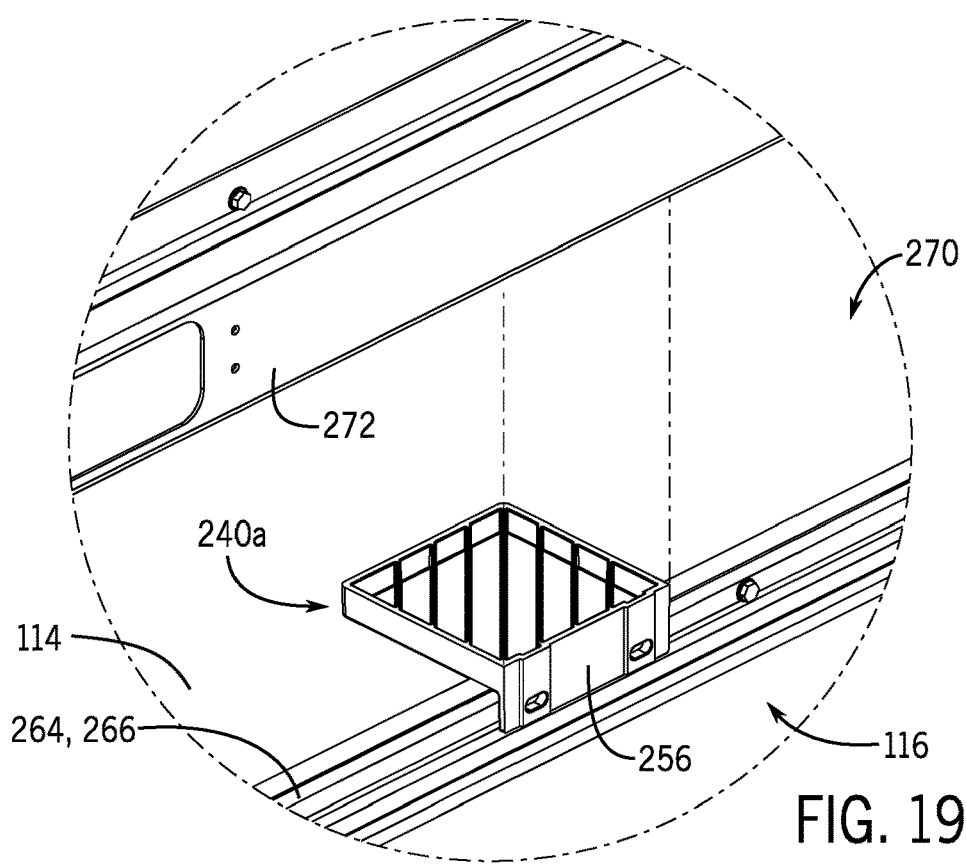
FIG. 19 is an expanded perspective view, taken within line 19-19 of FIG. 17, of an embodiment of an HVAC unit base rail positioned over a stacking bracket, in accordance with an aspect of the present disclosure.

FIG. 17 is a perspective view of the pair of HVAC units 100 positioned in the vertical array 101, in which the second HVAC unit 106 is stacked on and engaged with the brackets 108 of the first HVAC unit 104. Additionally, FIG. 18 is an expanded perspective view, taken within line 18-18 of FIG. 17, of the first corner bracket 130$a_1$ installed on the first HVAC unit 104, with the second HVAC unit 106 in a raised position, and FIG. 19 is an expanded perspective view, taken within line 19-19 of FIG. 17, of the first center bracket 240a installed on the first HVAC unit 104, with the second HVAC unit 106 in a raised position. FIGS. 17-19 are discussed concurrently below.

As shown in the illustrated embodiment of FIG. 17, the second HVAC unit 106 may include frame rails 272 that extend about a perimeter of the second enclosure 122. The frame rails 272 may be configured to engage with and rest on the contact surfaces 189 of the corner brackets 130a and the contact surfaces 248 of the center brackets 240. In this manner, the brackets 108 may transmit compressive force(s) generated by the second HVAC unit 106 and/or the straps 110 to the first enclosure 116 of the first HVAC unit 104. Additionally, the brackets 108 may block direct physical contact between the first enclosure 116 of the first HVAC unit 104 and the second enclosure 122 of the second HVAC unit 106.

As mentioned above, the alignment protrusions 160 of the corner brackets 130a may be configured to engage with the frame rails 272 of the second HVAC unit 106 when the first and second HVAC units 104, 106 are positioned in the vertical array 101. In this manner, the alignment protrusions 160 may substantially block translational movement of the second HVAC unit 106 relative to the first HVAC unit 104, and vice versa. The engagement between the alignment protrusion 160 of the first corner bracket 130$a_1$ and frame rails 272 of the second HVAC unit 106 is shown in FIG. 18. However, it should be noted that the alignment protrusions 160 of the remaining corner brackets 130a shown in FIG. 17 may engage with respective portions of the frame rails 272 in a substantially similar manner as the alignment protrusion 160 of the first corner bracket 130$a_1$.

As shown in the illustrated embodiment of FIG. 18, the frame rails 272 may include a hole or a receiver aperture 274 formed therein, which is configured to engage with the alignment protrusion 160. The conical tip 162 may facilitate alignment and insertion of the alignment protrusion 160 into the receiver aperture 274 and may guide the frame rails 272 along the alignment protrusion 160 toward the contact surface 189 of the first corner bracket 130$a_1$. Accordingly, in an engaged configuration of the second HVAC unit 106, the alignment protrusion 160 may extend into the frame rails 272 via the receiver aperture 274, and may therefore block translational movement of the frame rails 272 relative to the first corner bracket 130$a_1$ along the longitudinal and lateral axes 132, 136. As noted above, it should be appreciated that one or more of the corner brackets 130b and/or one or more of the corner brackets 130c may be coupled to the first HVAC unit 104 and configured to support the second HVAC unit 106 in addition to, or in lieu of, one or more of the corner brackets 130a. In such embodiments, the alignment protrusions 160 of the corner brackets 130b, 130c may engage with respective receiver apertures 274 of the frame rails 272 in a similar manner to the alignment protrusion 160 of the corner bracket 130a.

Figure 20:
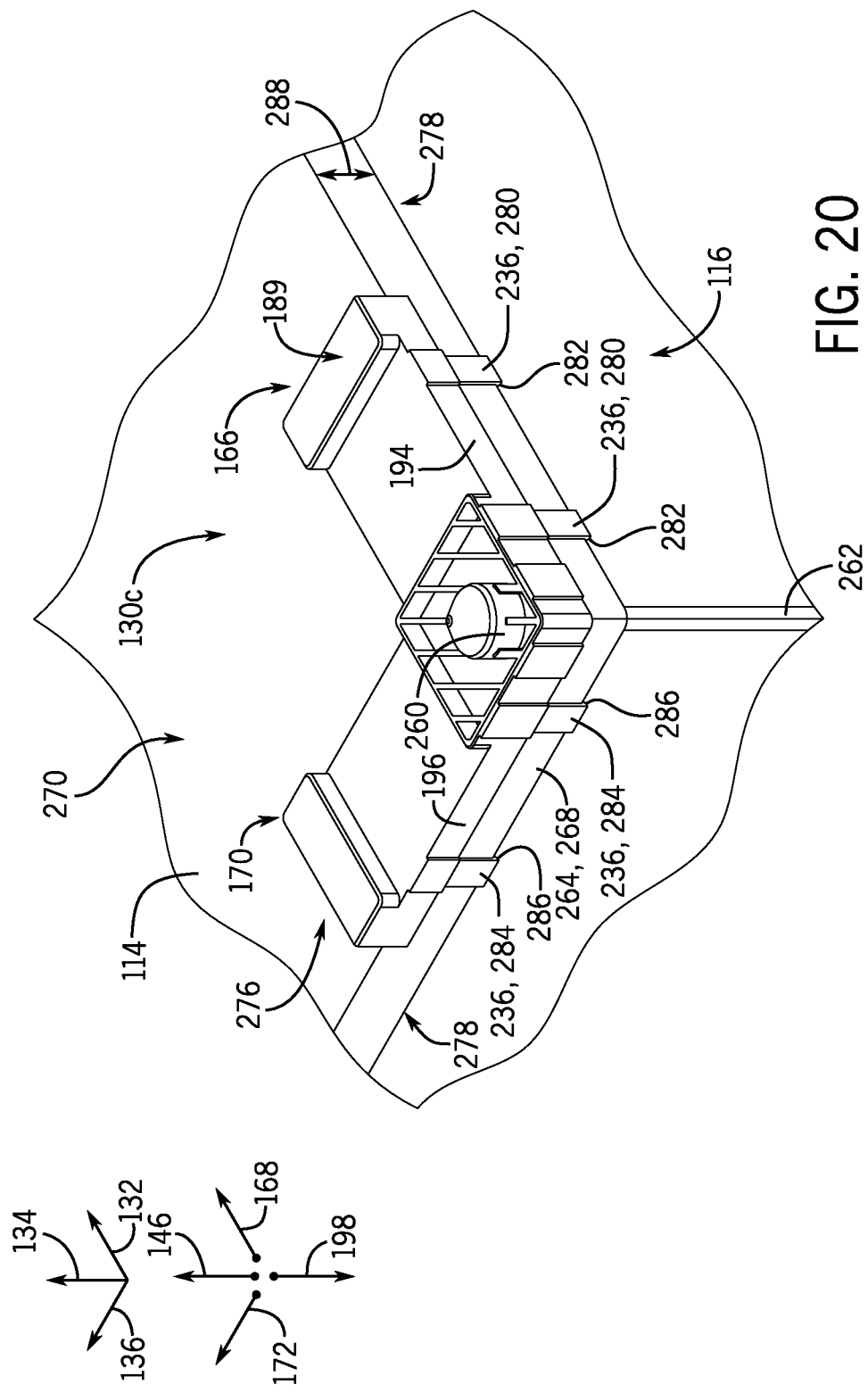
FIG. 20 is a perspective view of an embodiment of a stacking bracket in an installed configuration on an HVAC unit top panel, in accordance with an aspect of the present disclosure.

FIG. 20 is a perspective view of an embodiment of the corner bracket 130c in an installed configuration 276, where the corner bracket 130c is coupled to the first top panel 114 of the first HVAC unit 104. As shown in the illustrated embodiment, in the installed configuration 276, the first flange 194 may abut the first side wall 266 of the first top panel 114 and the second flange 196 may abut the second side wall 268 of the first top panel 114. Further, the lower surface 210 of the corner bracket 130c may rest on the upper surface 270 of the first top panel 114. The hooks 236 may extend along corresponding side walls 264 of the top panel 114 to engage with respective edges 278 of the side walls 264. Accordingly, the hooks 236 may couple the corner bracket 130c to the first top panel 114 via a snap connection.

For example, in some embodiments, a first group 280 of the hooks 236 extends from the first flange 194 in the fourth direction 198 and along the first side wall 266. Each hook 236 of the first group 280 also includes a respective tip 282 that extends past the first side wall 266 in the fourth direction 198 and also extends inward toward the first HVAC unit 104 in the third direction 172. In this way, the respective tip 282 of each hook 236 in the first group 280 engages with the edge 278 of the first side wall 266 to secure the corner bracket 130c to the first top panel 114 in the installed configuration 276. Similarly, a second group 284 of the hooks 236 extends from the second flange 196 in the fourth direction 198 and along the second side wall 268. Each hook 236 of the second group 284 also includes a respective tip 286 that extends past the second side wall 268 in the fourth direction 198 and also extends inward toward the first HVAC unit 104 in the second direction 168. Thus, the respective tip 284 of each hook 236 in the second group 284 engages with the edge 278 of the second side wall 268 to secure the corner bracket 130c to the first top panel 114 in the installed configuration 276.

In certain embodiments, the corner bracket 130c, the hooks 236, or both, may be formed from an elastically deformable material, such as a polymeric material. Accordingly, when translating the corner bracket 130c along the side walls 264 in the fourth direction 198 from an uninstalled configuration of the corner bracket 130c to the installed configuration 276, the tips 282, 286 may cause the hooks 236 to temporarily deflect or deform in a direction extending away from the corresponding side walls 264 of the first top panel 114. A dimension between the lower surface 210 of the corner bracket 130c and the tips 282, 286 of the hooks 236 may be substantially equal to a height 288 of the side walls 264. Accordingly, upon engaging the lower surface 210 of the corner bracket 130c with the upper surface 270 of the first top panel 114, the hooks 236 may snap inwardly toward the first HVAC unit 104 and into engagement with the edges 278 of the side walls 264 and thereby couple the corner bracket 130c to the first top panel 114. That is, the tips 282, 286 may snap across the respective edges 278 of the side walls 264, such that the hooks 236 return to their pre-deformed state.

Figure 21:
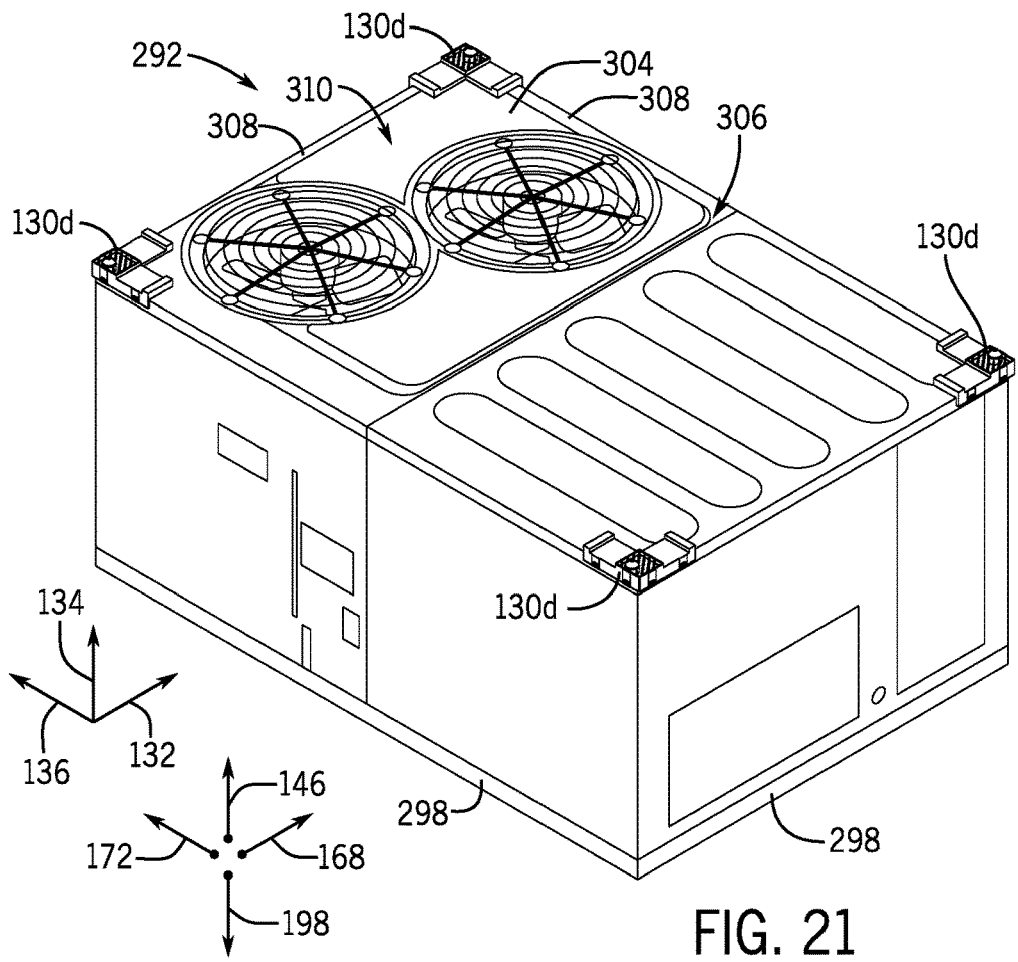
FIG. 21 is a perspective view of an embodiment of an HVAC unit having stacking brackets in an installed configuration, in accordance with an embodiment of the present disclosure.
Figure 22:
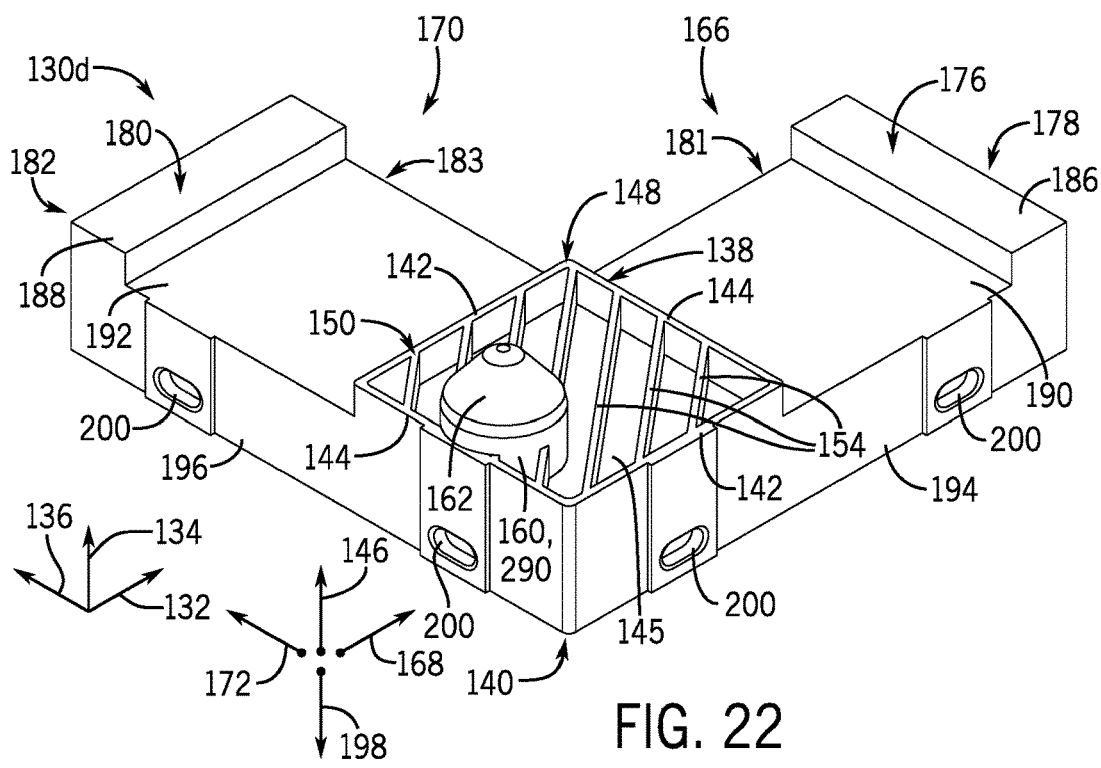
FIG. 22 is a top perspective view of an embodiment of a stacking bracket for an HVAC unit, in accordance with an aspect of the present disclosure.
Figure 23:
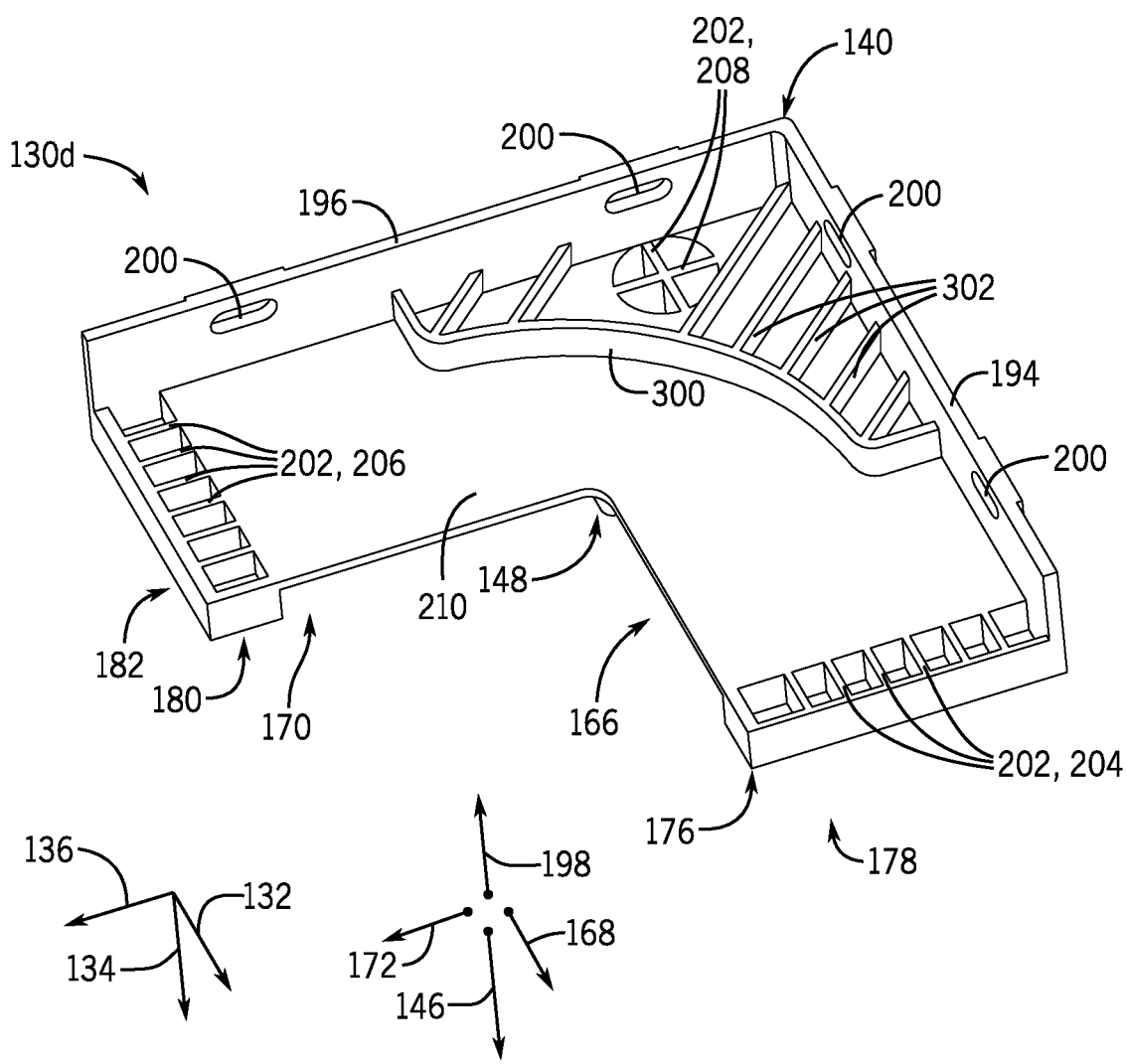
FIG. 23 is a bottom perspective view of an embodiment of a stacking bracket for an HVAC unit, in accordance with an aspect of the present disclosure.

FIG. 21 is a perspective view of another embodiment of a relatively small HVAC unit 292, illustrating an embodiment of the corner bracket 130 installed on the relatively small HVAC unit 292. In particular, the relatively small HVAC unit 292 includes a corner bracket 130d installed on each corner of the relatively small HVAC unit 292. FIG. 22 is a perspective view of the corner bracket 130d, and FIG. 23 is a perspective view of an underside of the corner bracket 130d. FIGS. 21-23 are discussed concurrently below. It should be noted that, in some embodiments, the corner bracket 130d may include certain features or sections that may be substantially similar to features or sections of corner brackets 130a, 130b, 130c discussed above. Accordingly, for consistency, reference numerals associated with certain features of the corner brackets 130a, 130b, 130c may be used to identify self-similar features of the corner bracket 130d in later discussion.

As shown in FIG. 22, the corner bracket 130d has an offset alignment protrusion 290 that is configured to engage with frame rails of the relatively small HVAC unit 292. The offset alignment protrusion 290 may intersect one or more of the walls 138 of the first raised section 148. As will be appreciated, the offset alignment protrusion 290 may be appropriately positioned to align with and engage with a respective receiver aperture formed within frame rails 298 of the relatively small HVAC unit 292, which may be stacked on top of corner bracket 130d.

As shown in the illustrated embodiment of FIG. 23, the corner bracket 130d includes a contoured wall 300 that extends along the lower surface 210 between the first flange 194 and the second flange 196. The corner bracket 130d may include a plurality of lower stiffening ribs 302 that extend from the lower surface 210 in the fourth direction 198 and span between the contoured wall 300 and the first and second flanges 194, 196. In some embodiments, the contoured wall 300 may include a profile that is substantially similar to an outer profile of a raised section 304 formed within a top panel 306 of the relatively small HVAC unit 292. Accordingly, in an installed configuration of the corner bracket 130d, the lower stiffening ribs 302 may rest on a surface 308 of the top panel 306, while the lower surface 210 of the corner bracket 130d may rest on a surface 310 of the raised section 304.

Figure 24:
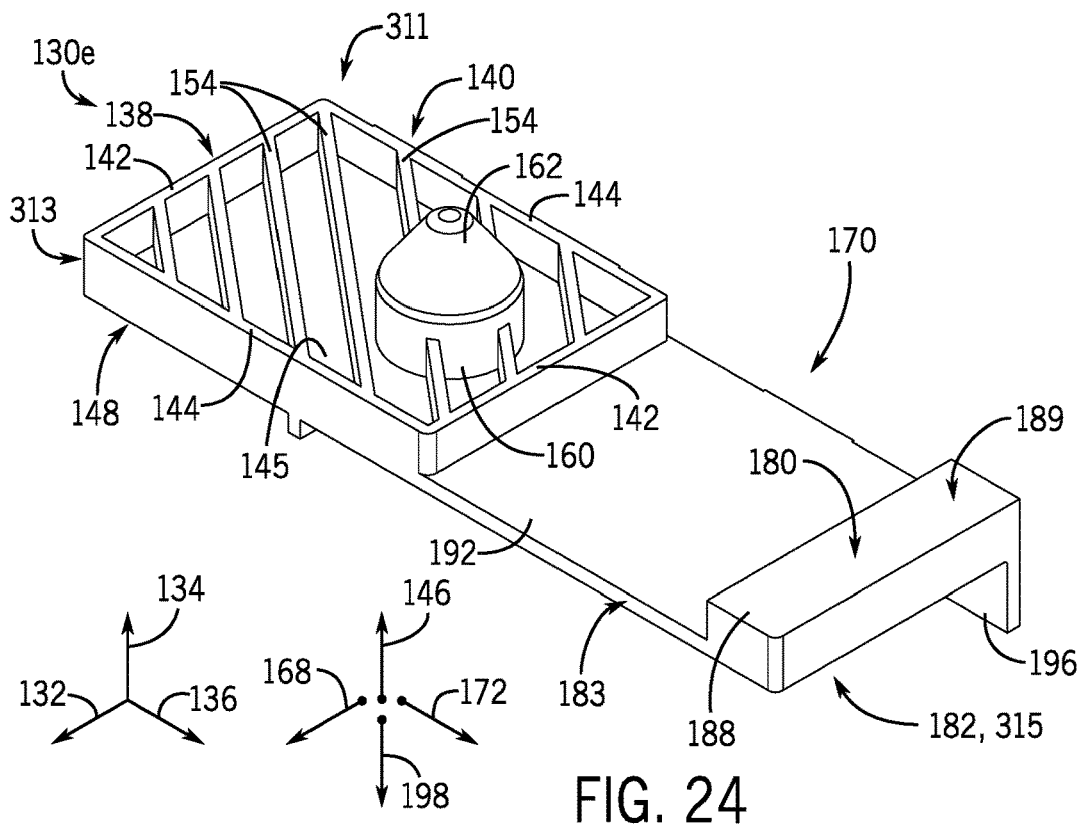
FIG. 24 is a top perspective view of an embodiment of a stacking bracket for an HVAC unit, in accordance with an aspect of the present disclosure.

FIG. 24 is a perspective view of another embodiment of the corner bracket 130. In particular, the illustrated embodiment shows a corner bracket 130e in which the first arm 166 is omitted, and the corner bracket 130e includes the second arm 170. It should be noted that the corner bracket 130e may include certain features or sections that may be substantially similar to features or sections of corner brackets 130a, 130b, 130c, 130d, discussed above. Accordingly, for conciseness, reference numerals associated with certain features of the corner brackets 130a, 130b, 130c, 130d may be used to identify self-similar features of the corner bracket 130e in later discussion.

As shown in the illustrated embodiment, the corner bracket 130e may include a generally rectangular main body 311 that extends along the lateral axis 136 from a first end portion 313 of the corner bracket 130e to a second end portion 315 of the corner bracket 130e. As discussed in detail below, this configuration may enable the corner bracket 130e to couple to a relatively large HVAC unit 312, as shown in FIG. 26.

Figure 25:
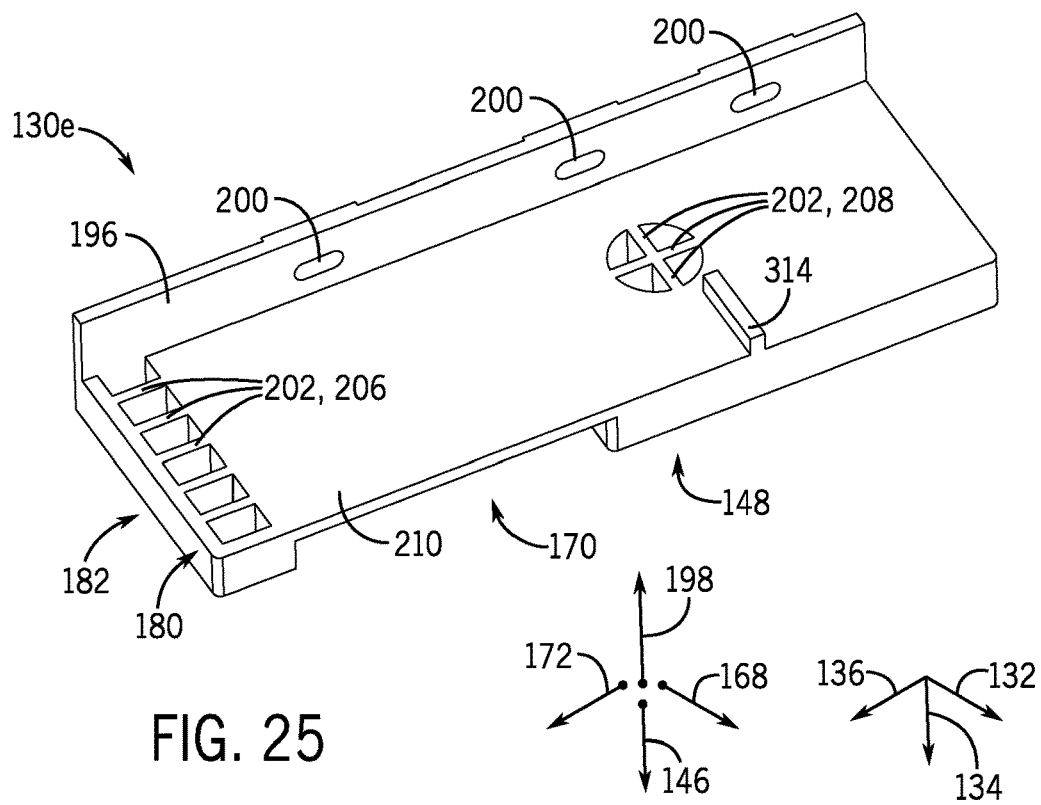
FIG. 25 is a bottom perspective view of an embodiment of a stacking bracket for an HVAC unit, in accordance with an aspect of the present disclosure.

FIG. 25 is a perspective view of an underside of the corner bracket 130e. In some embodiments, the corner bracket 130e may include an alignment rib 314 that extends from the lower surface 210 in the fourth direction 198. The alignment rib 314 may be positioned proximate the alignment protrusion 160 and may facilitate installation of the corner bracket 130e on the relatively large HVAC unit 312. In some embodiments, the alignment rib 314 may extend generally orthogonal to the second flange 196.

Figure 26:
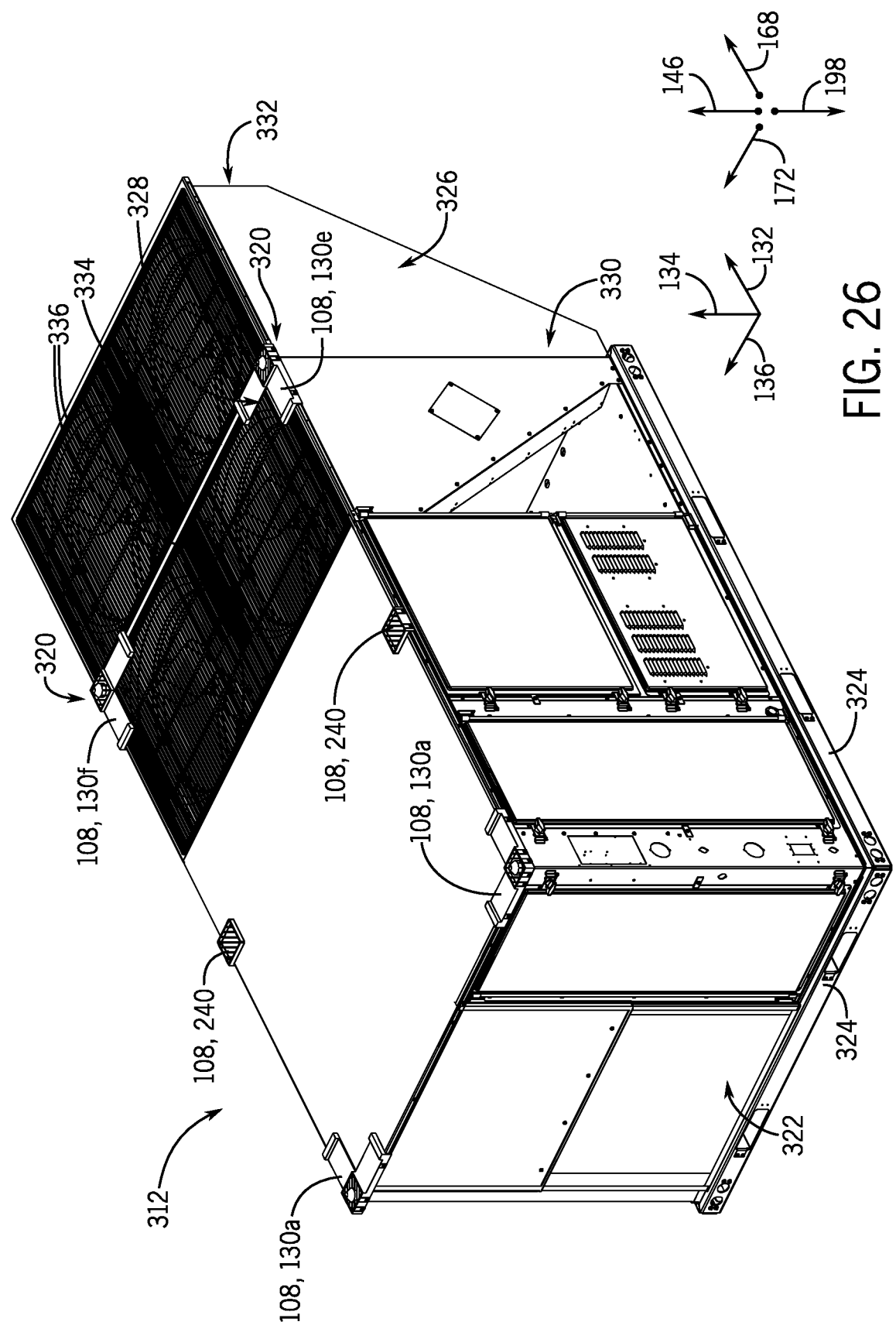
FIG. 26 is a perspective view of an embodiment of an HVAC unit having stacking brackets in an installed configuration, in accordance with an aspect of the present disclosure.

To better illustrate the engagement between the corner bracket 130e and the relatively large HVAC unit 312, FIG. 26 is a perspective view of the relatively large HVAC unit 312 having corner bracket 130e and a corner bracket 130f in an installed configuration 320. It should be noted that the corner bracket 130f may be a mirror image of the corner bracket 130e discussed above. That is, the corner bracket 130f may include substantially self-similar features to the corner bracket 130e, which are mirrored about a plane formed by the longitudinal axis 132 and the vertical axis 134. For conciseness, only the engagement between the corner bracket 130e and the relatively large HVAC unit 312 will be described below with reference to FIG. 26. However, it should be noted that the corner bracket 130f may engage with a corresponding portion of the relatively large HVAC unit 312 in a substantially similar manner as the corner bracket 130e.

As shown in the illustrated embodiment, the relatively large HVAC unit 312 may include a main enclosure 322 that is positioned vertically above frame rails 324 of the relatively large HVAC unit 312. The relatively large HVAC unit 312 includes a supplementary condenser section 326 that extends from the main enclosure 322 in the second direction 168 and therefore protrudes past the frame rails 324 in the second direction 168. In some embodiments, the supplementary condenser section 326 may be inadequate to support the weight of another HVAC unit that may be positioned above the relatively large HVAC unit 312 during storage and/or transportation of the HVAC units. Accordingly, the corner bracket 130e may be coupled to a portion of a top panel 328, such as a condenser shroud, of the main enclosure 322 instead of a portion of the supplementary condenser section 326. Indeed, the corner bracket 130e may be positioned above a corner portion 330 of the main enclosure 322 in lieu of being positioned above a corner portion 332 of the supplementary condenser section 326. Therefore, in the installed configuration 320, the corner bracket 130e may transmit compressive forces to the corner portion 330 of the main enclosure 322 instead of transmitting such compressive forces to the corner portion 332 of the supplementary condenser section 326. In this manner, the corner bracket 130e may ensure that the supplementary condenser section 326 is exposed to substantially negligible compressive or tensile forces when another HVAC unit is positioned atop the brackets 108. Additionally, if an HVAC unit self-similar to the relatively large HVAC unit 312 were stacked on top of the relatively large HVAC unit 312, any corner bracket 130 positioned at the corner portion 333 of the supplementary condenser section 326 would not be utilized to absorb any forces imparted by the stacked HVAC unit, because the frame rails 324 of the relatively large HVAC unit 312 do not extend to the corner portion 332 of the relatively large HVAC unit 312. In some embodiments, the alignment rib 314 of the corner bracket 130e may be configured to extend into a gap 334 positioned between a pair of condenser fan shrouds 336 included in the relatively large HVAC unit 312, and thus, may facilitate alignment of the corner bracket 130e on top of the corner portion 330.

Figure 27:
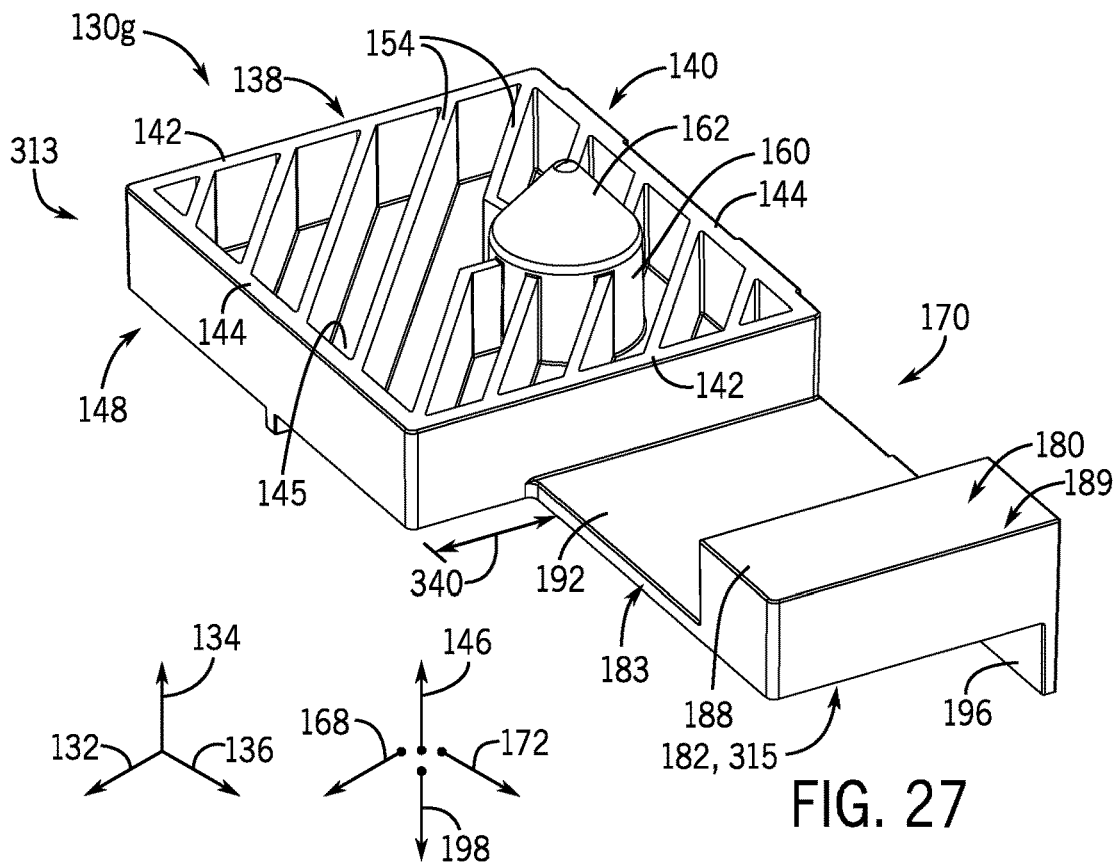
FIG. 27 is a top perspective view of an embodiment of a stacking bracket for an HVAC unit, in accordance with an aspect of the present disclosure.
Figure 28:
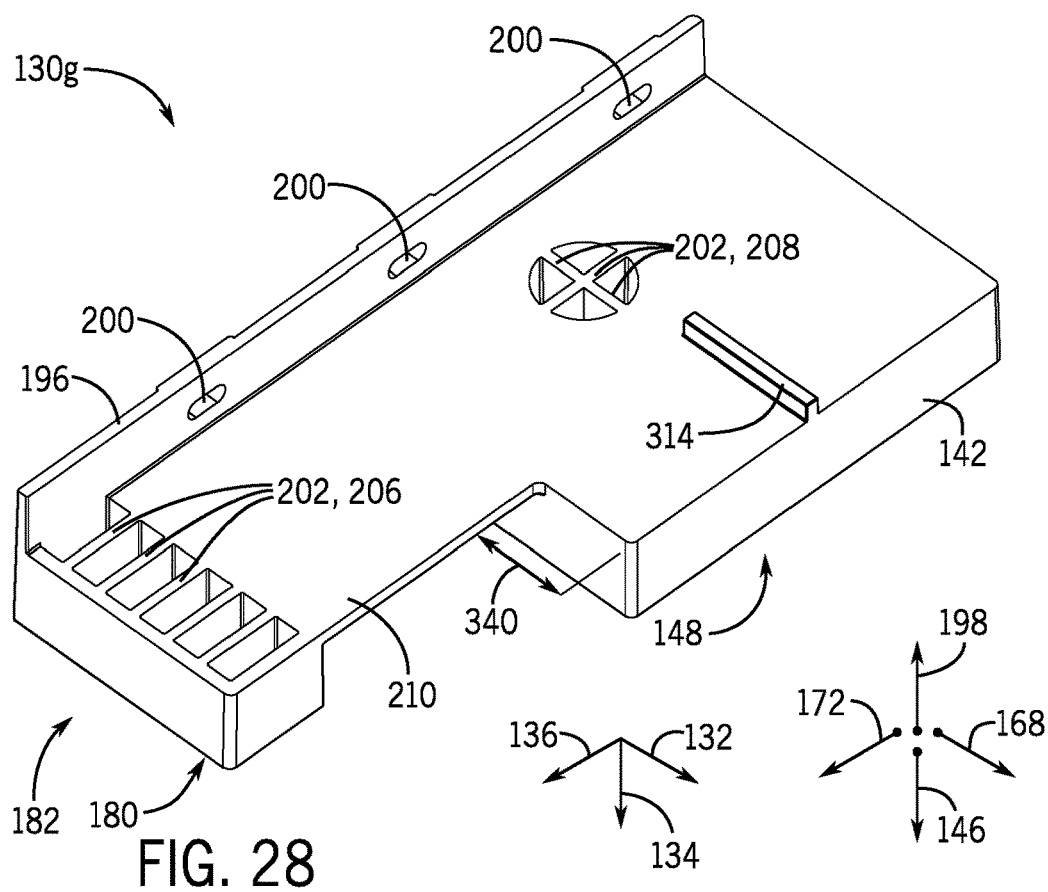
FIG. 28 is a bottom perspective view of an embodiment of a stacking bracket for an HVAC unit, in accordance with an aspect of the present disclosure.
Figure 29:
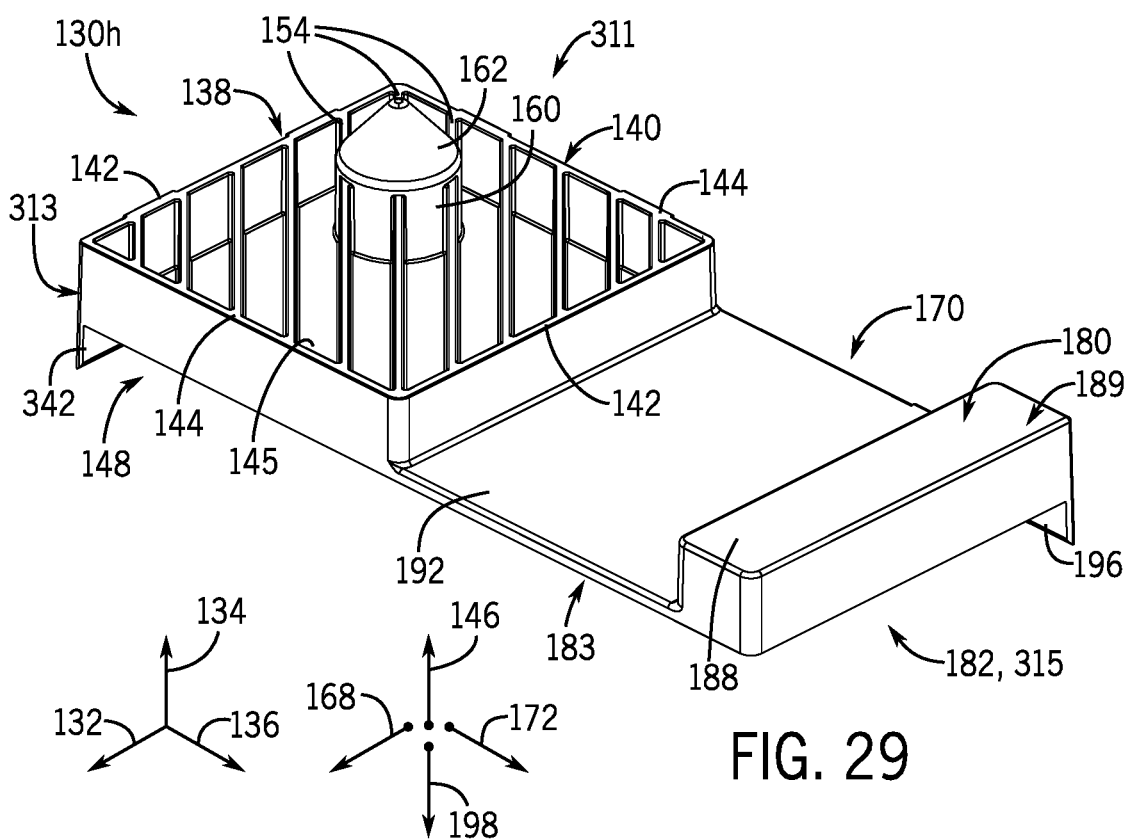
FIG. 29 is a top perspective view of an embodiment of a stacking bracket for an HVAC unit, in accordance with an aspect of the present disclosure.
Figure 30:
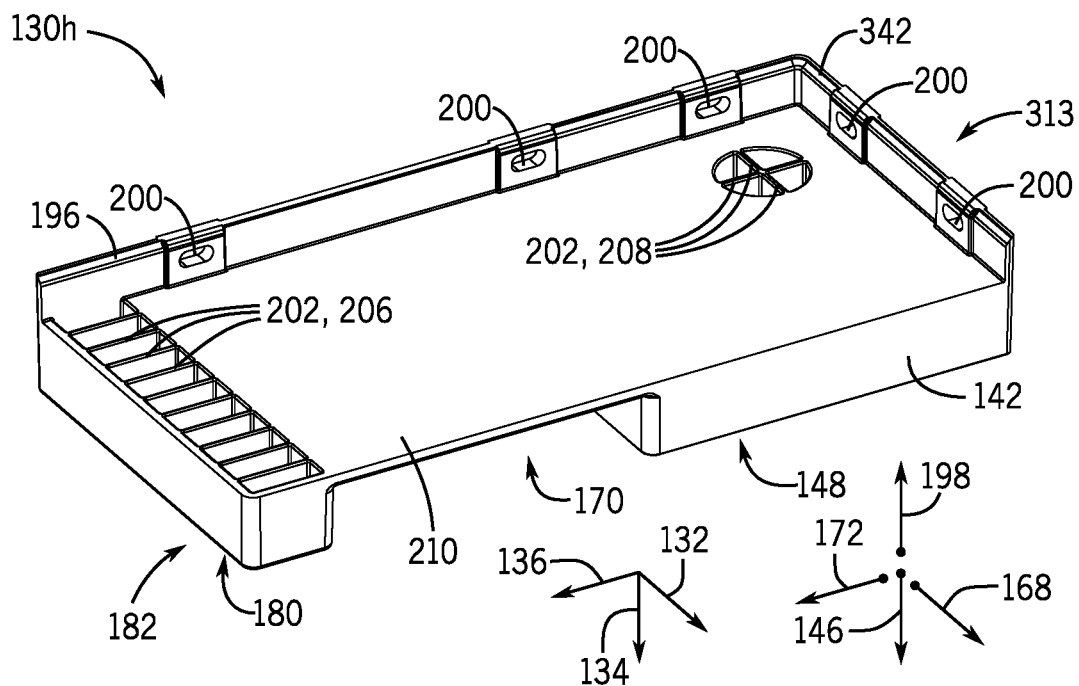
FIG. 30 is a bottom perspective view of an embodiment of a stacking bracket for an HVAC unit, in accordance with an aspect of the present disclosure.

FIGS. 27-30 are perspective views of further embodiments of the corner bracket 130e shown in FIGS. 24 and 25. In particular, the illustrated embodiments of FIGS. 27 and 28 show a corner bracket 130g in which the corner portion 140 protrudes past the second arm 170 in the second direction 168 by a width 340. The illustrated embodiments of FIGS. 29 and 30 show a corner bracket 130h in which a flange 342 extends along the first end portion 313 of the corner bracket 130h in the second direction 168 and from the wall 138 of the first end portion 313 in the fourth direction 198. It should be noted that the corner brackets 130g, 130h may include certain features or sections that may be substantially similar to features or sections of the corner bracket 130e discussed above. Accordingly, reference numerals associated with certain features of the corner bracket 130e are used to identify self-similar features of the corner brackets 130g, 130h in FIGS. 27-30.

It should be appreciated that, in some embodiments, various of the brackets 108 discussed above may be provided in a kit to facilitate selection and installation of particular brackets 108 on certain HVAC units 12, such as the HVAC units 100, the relatively small HVAC unit 292, the relatively large HVAC unit 312, another rooftop unit, and/or any other suitable HVAC unit 12. That is, such a bracket 108 kit may include any combination of one or more of the corner brackets 130a, 130b, 130c, 130d, 130e, 130f, 130g, 130h and/or one or more of the center brackets 240. Further, it should be noted that the corner brackets 130, the center brackets 240, or both, may be formed from a polymeric material such as glass-filled plastic polymeric materials. In some embodiments, the corner brackets 130 and/or the center brackets 240 may be manufactured via an additive manufacturing process, such as via a Direct Laser Sintering (DLS) system, Direct Laser Melting (DLM) system, or any other suitable 3D printing or additive manufacturing apparatus.

As set forth above, embodiments of the present disclosure may provide one or more technical effects useful for facilitating stacking of one or more HVAC units 100 in a vertical column, such as the vertical array 101. In particular, the disclosed brackets 108 are configured to transmit compressive forces between reinforced portions of the HVAC enclosures 116, 122 that are designed to support such loads without flexing, bending, or deformation. That is, the brackets 108 may eliminate physical contact between portions of the enclosures 116, 122 that may be ill-equipped to support such compressive loading and/or tensile loading. Moreover, the brackets 108 are configured to substantially block translation movement between the HVAC units 100 in the vertical array 101 and, as a result, mitigate a likelihood of scratching or wear on the enclosures 116, 122 of the HVAC units 100 due to undesirable interaction between adjacent enclosures 116, 122 in the vertical array 101. The technical effects and technical problems in the specification are examples and are not limiting. It should be noted that the embodiments described in the specification may have other technical effects and can solve other technical problems.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A bracket for stacking heating, ventilation, and air conditioning (HVAC) units, comprising:
a corner portion having a first raised section and an alignment protrusion extending from the corner portion;
a first arm extending from the corner portion and having a second raised section at a first end of the first arm, wherein a first strap chamfer is formed between the first raised section and the second raised section; and
a second arm extending from the corner portion and having a third raised section at a second end of the second arm, wherein a second strap chamfer is formed between the first raised section and the third raised section.

2. The bracket of claim 1, wherein the first raised section includes walls extending about a perimeter of the corner portion.

3. The bracket of claim 2, wherein the corner portion includes stiffening ribs extending between the walls of the first raised section.

4. The bracket of claim 1, wherein the alignment protrusion includes a conical tip configured to extend into a hole of an HVAC unit base rail positioned on top of the bracket.

5. The bracket of claim 1, comprising a first flange extending in a direction opposite the alignment protrusion from the corner portion and the first arm, and a second flange extending in the direction opposite the alignment protrusion from the corner portion and the second arm, wherein the first flange and the second flange are configured to abut side walls of an HVAC unit top panel.

6. The bracket of claim 5, comprising a first hook extending from the first flange and a second hook extending from the second flange, wherein the first and second hooks are configured to engage with edges of the side walls in an installed configuration.

7. The bracket of claim 1, wherein the first end is a first distal end of the first arm, and the second end is a second distal end of the second arm.

8. The bracket of claim 1, wherein the first arm includes a first hollow interior region that extends between a first set of opposed walls of the first arm, and the second arm includes second hollow interior region that extends between a second set of opposed walls of the second arm.

9. The bracket of claim 8, wherein a first set of stiffening ribs extends across the first hollow interior region between the first set of opposed walls, and a second set of stiffening ribs extends across the second hollow interior region between the second set of opposed walls.

10. The bracket of claim 1, wherein the alignment protrusion includes a hollow interior region that extends between an interior surface of the alignment protrusion, and includes a plurality of stiffening ribs extending along the hollow interior region between diametric ends of the interior surface.

11. The bracket of claim 1, comprising a first flange extending in a direction opposite the alignment protrusion from the corner portion and the first arm, and a second flange extending in the direction opposite the alignment protrusion from the corner portion and the second arm, wherein the first flange, the second flange, or both, include a respective mounting aperture formed therein.

12. A bracket for stacking heating, ventilation, and air conditioning (HVAC) units, comprising:
   a corner portion having a base surface and a plurality of walls extending from the base surface to define a first raised contact surface of the corner portion;
   a first arm extending from the corner portion and having a second raised contact surface at a first end of the first arm, wherein a first strap surface extends between the first raised contact surface and the second raised contact surface; and
   a second arm extending from the corner portion and having a third raised contact surface at a second end of the second arm, wherein a second strap surface extends between the first raised contact surface and the third raised contact surface, and wherein the first raised contact surface, the second raised contact surface, and the third raised contact surface are configured to support weight of an HVAC unit.

13. The bracket of claim 12, wherein the first strap surface and the second strap surface are substantially coplanar with the base surface.

14. The bracket of claim 13, wherein the first strap surface extends between the first raised contact surface and the second raised contact surface to define a first strap recess, and the second strap surface extends between the first raised contact surface and the third raised contact surface to define a second strap recess.

15. The bracket of claim 12, comprising a plurality of stiffening ribs extending from the base surface and extending between the plurality of walls, wherein distal ends of the plurality of stiffening ribs form the first raised contact surface, and wherein the first strap surface and the second strap surface are substantially coplanar with the first raised contact surface.

16. The bracket of claim 12, comprising a first flange extending in a direction opposite the plurality of walls from the corner portion and the first arm, and a second flange extending in the direction opposite the plurality of walls from the corner portion and the second arm.

17. The bracket of claim 16, comprising a first strap chamfer formed on the first arm and extending between the first strap surface and the first flange, and a second strap chamfer extending between the second strap surface and the second flange.

18. The bracket of claim 12, comprising an alignment protrusion extending from the base surface in a common direction with the plurality of walls, wherein the alignment protrusion extends beyond the plurality of walls in the common direction.

19. The bracket of claim 12, comprising a first hook extending from the first arm in a direction opposite the plurality of walls and a second hook extending from the second arm in the direction opposite the plurality of walls, wherein the first hook and the second hook are configured to engage with edges of an HVAC unit top panel in an installed configuration of the bracket.

20. The bracket of claim 12, wherein an angle between the first arm and the second arm is approximately ninety degrees.

* * * * *